US012786613B2

(12) United States Patent
Fu et al.

(10) Patent No.: US 12,786,613 B2
(45) Date of Patent: Nov. 3, 2026

(54) CORE MODULES AND ELECTRONIC DEVICES

(71) Applicant: SHENZHEN SHOKZ CO., LTD., Shenzhen (CN)

(72) Inventors: Junjiang Fu, Shenzhen (CN); Chaowu Li, Shenzhen (CN); Peigeng Tong, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 112 days.

(21) Appl. No.: 19/000,773

(22) Filed: Dec. 24, 2024

(65) Prior Publication Data

US 2025/0133327 A1 Apr. 24, 2025

Related U.S. Application Data

(63) Continuation of application No. PCT/CN2023/073872, filed on Jan. 30, 2023.

(51) Int. Cl.
*H04R 1/10* (2026.01)
*H04R 9/02* (2006.01)
*H04R 9/06* (2006.01)

(52) U.S. Cl.
CPC ......... *H04R 1/1075* (2013.01); *H04R 1/1008* (2013.01); *H04R 1/105* (2013.01); *H04R 9/025* (2013.01); *H04R 9/06* (2013.01); *H04R 2460/13* (2013.01)

(58) Field of Classification Search
None
See application file for complete search history.

(56) References Cited

U.S. PATENT DOCUMENTS

2009/0301339 A1 12/2009 Ito et al.
2021/0168493 A1* 6/2021 Zheng .................. H04R 1/1091
2022/0369020 A1* 11/2022 Zhang .................... H04R 1/026
2023/0068430 A1* 3/2023 Li .......................... H04R 1/023
2024/0089358 A1 3/2024 Li et al.

FOREIGN PATENT DOCUMENTS

CN 214756797 U 11/2021
CN 115209286 A 10/2022
JP 2015198529 A 11/2015

OTHER PUBLICATIONS

International Search Report in PCT/CN2023/073872 mailed on Oct. 2, 2023, 6 pages.
Written Opinion in PCT/CN2023/073872 mailed on Oct. 2, 2023, 5 pages.

* cited by examiner

*Primary Examiner* — Antim G Shah
(74) *Attorney, Agent, or Firm* — METIS IP LLC

(57) ABSTRACT

A core module and an electronic device are provided. The core module comprises a housing component, a transducer device, and a vibration panel. The housing component includes a core housing, a core cover plate, and a sealing film. The transducer device includes a support. The core cover plate and the sealing film are respectively provided with a first avoidance hole and a second avoidance hole allowing the vibration panel to be connected with the support. The sealing film is configured to seal an assembly clearance of the first avoidance hole. At least one of the vibration panel and the support is provided with a support end surface corresponding to a surrounding region of the second avoidance hole. The sealing film is fixed on the support end surface.

15 Claims, 17 Drawing Sheets

CORE MODULES AND ELECTRONIC DEVICES

CROSS-REFERENCE TO RELATED APPLICATIONS

This application is a Continuation of International Application No. PCT/CN2023/073872, filed on Jan. 30, 2023, the contents of which are hereby incorporated by reference.

TECHNICAL FIELD

The present disclosure relates to the technical field of electronic devices, and in particular to a core module and an electronic device.

BACKGROUND

With the increasing popularity of electronic devices, electronic devices have become an indispensable social and entertainment tool in people's daily life, and people's requirements for electronic devices are also increasing. Electronic devices such as earphones and smart glasses have also been widely used in people's daily life, which can be used with terminal devices such as mobile phones and computers to provide users with an auditory feast.

SUMMARY

One or more embodiments of the present disclosure provide a core module. The core module may comprise a housing component, a transducer device, and a vibration panel. The housing component may include a core housing and a core cover plate covering an open end of the core housing, and a sealing film. The transducer device may include a support. The core cover plate and the sealing film may be respectively provided with a first avoidance hole and a second avoidance hole allowing the vibration panel to be connected with the support. The sealing film may be configured to seal an assembly clearance of the first avoidance hole. At least one of the vibration panel and the support may be provided with a support end surface corresponding to a surrounding region of the second avoidance hole. The sealing film may be fixed on the support end surface.

In some embodiments, the support may be provided with a first support end surface. The vibration panel may be provided with a second support end surface. The sealing film may include a first connection portion, a folded ring portion, and a second connection portion which are integrally connected. The folded ring portion may connect the first connection portion and the second connection portion. The first connection portion may be connected with the core cover plate. The second avoidance hole may be disposed on the second connection portion. The first support end surface and the second support end surface may jointly clamp the second connection portion.

In some embodiments, a stiffness of the first connection portion and a stiffness of the second connection portion may be greater than a stiffness of the folded ring portion, respectively.

In some embodiments, the folded ring portion may protrude in a direction away from the transducer device in a vibration direction of the transducer device.

In some embodiments, a concave region may be disposed on a side of the core cover plate away from the transducer device. The first avoidance hole may be disposed at a bottom of the concave region. The first connection portion may be connected with the bottom of the concave region and surround the first avoidance hole.

In some embodiments, the concave region may include a first concave section and a second concave section. The first concave section may be closer to the transducer device than the second concave section in the vibration direction of the transducer device. A size of the second concave section in a direction perpendicular to the vibration direction may be greater than a size of the first concave section in the direction perpendicular to the vibration direction. The first connection portion may be connected with a bottom of the first concave section through a double-sided tape, and the second concave section may contain glue, or the first connection portion may be connected with the bottom of the first concave section through the glue.

In some embodiments, the core cover plate may include an inner top portion, a connection portion, and an outer bottom portion which are integrally connected. The inner top portion and the outer bottom portion may be staggered from each other in the vibration direction of the transducer device. An orthographic projection of the outer bottom portion on a reference plane perpendicular to the vibration direction may surround an orthographic projection of the inner top portion on the reference plane. The connection portion may connect the inner top portion and the outer bottom portion. The outer bottom portion may be connected with the housing component. The outer bottom portion may be closer to the transducer device than the inner top portion in the vibration direction. The concave region may be disposed on the inner top portion.

In some embodiments, the core housing may include a first housing and a second housing. The first housing may include a cylindrical sidewall and an annular support connected with an inner wall surface of the cylindrical sidewall. The second housing may seal one end of the cylindrical sidewall, the other end of the cylindrical sidewall may be open. The outer bottom portion may be supported on the annular support.

In some embodiments, the core module may include a first vibration transmission plate. The transducer device may include a second vibration transmission plate, a magnetic circuit system, and a coil. The magnetic circuit system may be connected with the support through the second vibration transmission plate. The coil may be connected with the support and extend into a magnetic gap of the magnetic circuit system.

In some embodiments, the support may include a first support, a second support, and a suspension. The first support may be connected with a central region of the first vibration transmission plate and include a body portion and a plug-in portion connected with the body portion. The plug-in portion may be cylindrical. The vibration panel may be partially embedded in the plug-in portion. An end face of the plug-in portion not connected with the body portion may be a support end surface. The second support may be connected with a peripheral region of the second vibration transmission plate. The suspension may be connected with a central region of the second vibration transmission plate. The magnetic circuit system may be connected with the suspension. The coil may be connected with the second support. A plug-in portion post may be disposed on one of the body portion and the second support, and a plug-in hole for accommodating the plug-in post may be disposed on the other of the body portion and the second support. The plug-in post may be embedded in the plug-in hole.

One or more embodiments of the present disclosure provide an electronic device. The electronic device may comprise a support component and the core module described above. The support component may be connected with the core module to support the core module to be worn to a wearing position.

The beneficial effects of the present disclosure include that in the present disclosure, under the restriction effect of the core cover plate and the sealing film, the air in the first cavity where the transducer device is located can be restricted to enter and exit the core module to the greatest extent, and the aperture of the first avoidance hole can also be set larger due to the sealing film, which further avoids the vibration panel and/or the transducer device from colliding with the core cover plate, and the sealing film is fixed on the support end surface of the vibration panel and/or the support, so as to be simple and reliable.

BRIEF DESCRIPTION OF THE DRAWINGS

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to obtain other drawings in accordance with these drawings without creative labor.

DETAILED DESCRIPTION

The present disclosure is further described in detail below with reference to the accompanying drawings and embodiments. It is particularly noted that the following embodiments are only used to illustrate the present disclosure, but are not intended to limit the scope of the present disclosure. Similarly, the following embodiments are only some embodiments of the present disclosure rather than all embodiments, and all other embodiments obtained by a person of ordinary skill in the art without creative labor are within the scope of protection of the present disclosure Reference to “embodiment” in the present disclosure means that a specific feature, structure or characteristic described with reference to the embodiment may be included in at least one embodiment of this application. It is explicitly and implicitly understood by those skilled in the art that the embodiment described in this application may be combined with other embodiments.

In the present disclosure, an electronic device 10 may be a terminal device with a sound production function such as an earphone and smart glasses. The electronic device 10 may include a core module 11 and a support component 12. The support component 12 may be connected with the core module 11 to support the core module 11 to be worn to a wearing position. The core module 11 may generate a mechanical vibration under the action of an excitation signal, and the mechanical vibration may be transmitted to a user based on at least one of a bone conduction mode and an air conduction mode. In some embodiments, referring to FIG. 1, the support component 12 may be configured to be supported on an ear of the user in a wearing state, and further arranged around the back of the head of the user. Two core modules 11 may be provided, and the two core modules 11 may be connected with two ends of the support component 12 one by one. In some embodiments, the support component 12 may also be configured to be supported on the ear, the nose bridge, and other physiological parts of the user in the wearing state, and may also be configured to bypass the top of the head of the user in the wearing state, which are not limited in the present disclosure. Accordingly, the wearing position may be a position of a cheek of the user close to the ear, a position of the ear away from the side of the head, or other physiological parts, which are not limited in the present disclosure.

Figure 2:
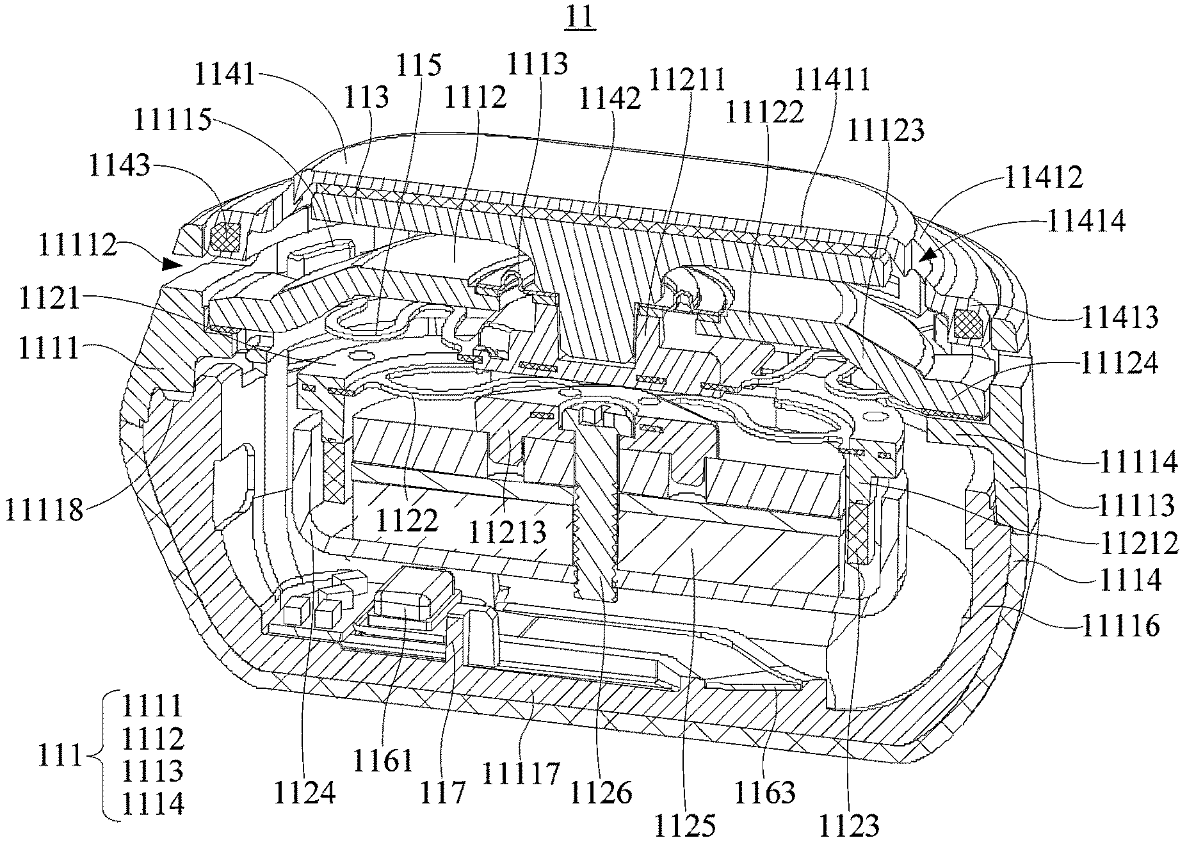
FIG. 2 is a schematic diagram illustrating an exemplary cross section of a core module according to some embodiments of the present disclosure.
Figure 3:
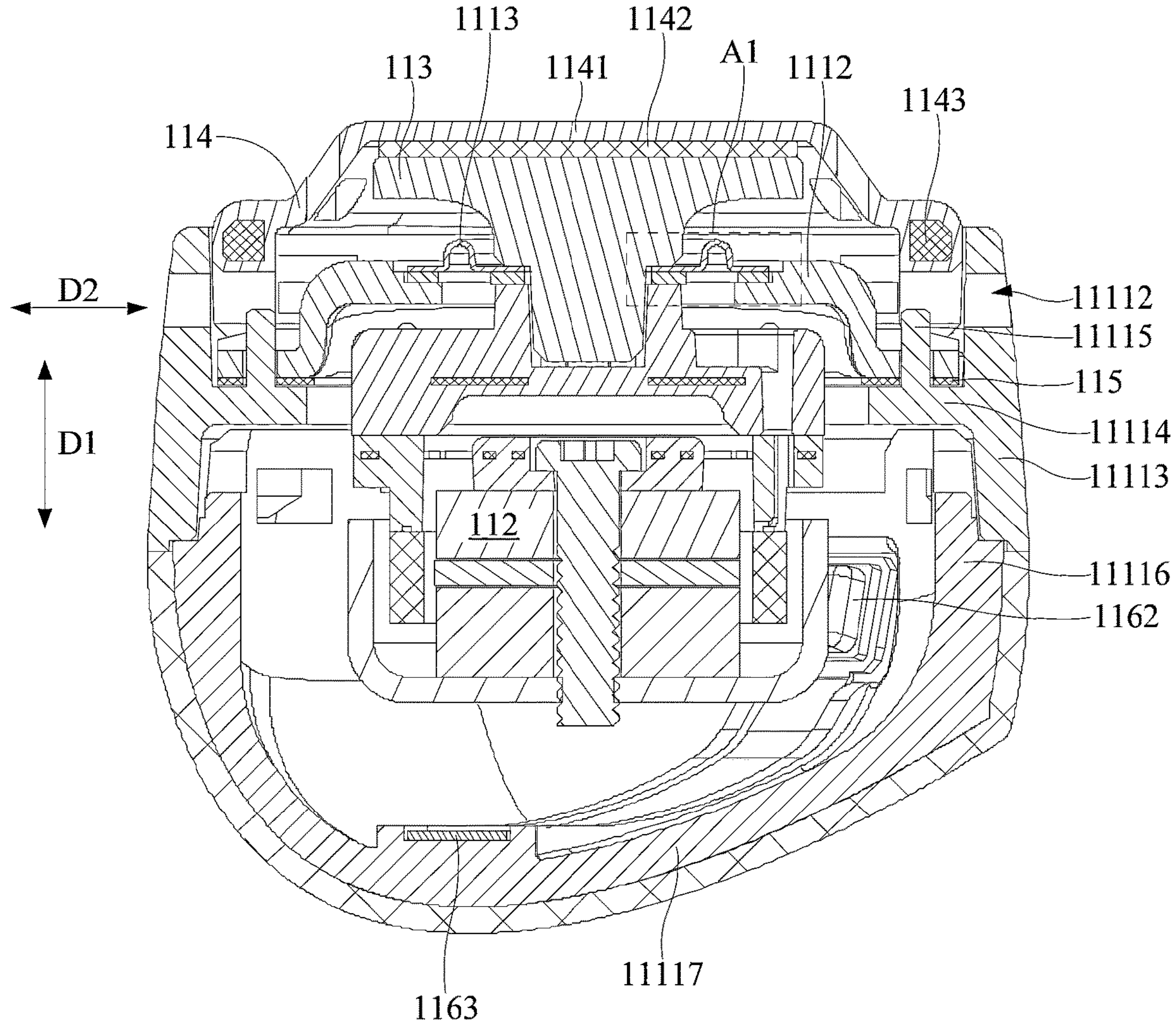
FIG. 3 is a schematic diagram illustrating another exemplary cross section of a core module according to some embodiments of the present disclosure.

In some embodiments, referring to FIG. 2 and FIG. 3, the core module 11 may include a housing component 111, a transducer device 112 device, and a vibration panel 113. The transducer device 112 may be configured to generate the mechanical vibration under the action of the excitation signal and may be disposed in the housing component 111. The vibration panel 113 may be connected with the transducer device 112 to indirectly abut against or directly contact a skin of the user to transmit the mechanical vibration.

In some embodiments, the core module 11 may include a face attachment component 114 connected with at least the vibration panel 113. For example, the face attachment component 114 may cover the vibration panel 113, such that the vibration panel 113 may contact the skin of the user through the face attachment component 114, thereby realizing both the sound quality and wearing comfort of the electronic device 10.

In some embodiments, referring to FIG. 2 and FIG. 3, the core module 11 may include a first vibration transmission plate 115. The transducer device 112 may be connected with the housing component 111 through the first vibration transmission plate 115. In this way, compared with the transducer device 112 being directly fixed in the housing component 111, such configuration prevents the mechanical vibration generated by the transducer device 112 from being excessively transmitted to the housing component 111, thereby reducing the sound leakage of the core module 11. The transducer device 112 may include a support 1121, a second vibration transmission plate 1122, a magnetic circuit system, and a coil 1123. The support 1121 may be connected with the housing component 111 through the first vibration transmission plate 115. The magnetic circuit system may be connected with the support 1121 through the second vibration transmission plate 1122. The coil 1123 may be connected with the support 1121, and extend into a magnetic gap of the magnetic circuit system. In this way, under the action of the excitation signal, the energized coil 1123 may generate an Ampere force in the magnetic field of the magnetic circuit system, which causes the support 1121 to move relative to the magnetic circuit system, i.e., generate the mechanical vibration. In some embodiments, the magnetic circuit system may include a magnetic shield 1124 and one or more magnets 1125. The one or more magnets 1125 may be fixed to a bottom of the magnetic shield 1124 to form the magnetic gap with a sidewall of the magnetic shield 1124. One or more magnets 1125 may be provided (e.g., two magnets 1125 shown in FIG. 2 and FIG. 3). Two adjacent magnets 1125 may be arranged with the same poles facing each other and a magnetic conductive plate may be clamped between the two adjacent magnets 1125, such that magnetic flux lines of the two adjacent magnets 1125 pass more through the coil 1123. In some embodiments, the magnetic circuit system may include a fastening member 1126 capable of fixing the one or more stacked magnets 1125 and the magnetic conductive plate clamped therebetween. For example, fastening member 1126 may connect the second vibration transmission plate 1122, the one or more magnets 1125, and a bottom of the magnetic conductive cover 1124. In some embodiments, the one or more magnets 1125 may be fixed to the bottom of the magnetic conductive cover 1124 by glue.

In some embodiments, referring to FIG. 2 and FIG. 3, the face attachment component 114 may include a face attachment sleeve 1141. The face attachment sleeve 1141 may cover the vibration panel 113. For example, the face attachment sleeve 1141 may be connected with the vibration panel 113 through a bonding medium 1142, which is conducive to increasing the flatness of the face attachment sleeve 1141 on the vibration panel 113, and increasing the synchronization of the face attachment sleeve 1141 and the vibration panel 113 during the vibration process. The bonding medium 1142 may be configured to allow the face attachment component 114 to be removed from the vibration panel 113 as a whole without damaging the face attachment component 114 or the vibration panel 113. In this way, the face attachment component 114 is not only detachable, which makes it easy for the user to replace the face attachment component 114 with a new one when needed, but also can be removed as a whole to avoid rupture, which reduces the difficulty of removing the face attachment component 114 from the core module 11, thereby improving the portability of replacement of the face attachment component 114.

In some embodiments, the bonding medium 1142 may be configured such that a stripping force between the face attachment sleeve 1141 and the vibration panel 113 is between 4N and 12N. If the stripping force is too small (i.e., a bonding force is too small), it causes the face attachment sleeve 1141 to be insufficiently flat on the vibration panel 113 and poor synchronization with the vibration panel 113 during the vibration process. If the stripping force is too large (i.e. the bonding force is too large), the face attachment sleeve 1141 is difficult to be removed from the vibration panel 113 as a whole.

In some embodiments, the stripping force between the bonding medium 1142 and the face attachment sleeve 1141 may be greater than the stripping force between the bonding medium 1142 and the vibration panel 113. In this way, when the face attachment sleeve 1141 is removed from the vibration panel 113, the bonding medium 1142 is more likely to be stripped off along with the face attachment component 114 rather than remaining on the vibration panel 113. That is, the risk of residual glue on the vibration panel 113 is reduced, so as to facilitate the replacement of a new face attachment component 114. A material of the bonding medium 1142 is more likely to be similar to that of the face attachment sleeve 1141, so as to increase the bonding force between the bonding medium 1142 and the face attachment sleeve 1141.

In some embodiments, the bonding medium 1142 may be a double-sided tape or cured glue. Adhesive layers on front and rear sides of the double-sided tape may be differentially designed according to materials of the face attachment sleeve 1141 and the vibration panel 113, and a material of the glue may also be selected to be a glue material similar to the material of the face attachment sleeve 1141. In some embodiments, a hardness of the face attachment sleeve 1141 may be less than a hardness of the vibration panel 113, and a hardness of the bonding medium 1142 may also be less than the hardness of the vibration panel 113. The material of the vibration panel 113 may be polycarbonate or at least one of glass fibers and carbon fibers mixed therein. The material of the face attachment sleeve 1141 may be silicone, rubber, etc. Therefore, the glue may be silicone soft glue.

In some embodiments, a ratio of an area of the bonding medium 1142 to an area of the vibration panel 113 may be in a range of 0.8-1. For example, the bonding medium 1142 may cover the entire vibration panel 113 (commonly referred to as "full bonding"). As another example, the bonding medium 1142 may be in a grid shape. If the ratio is too small, it causes the face attachment sleeve 1141 to be insufficiently flat on the vibration panel 113 and poor synchronization with the vibration panel 113 during the vibration process. It should be noted that an area of the face attachment sleeve 1141 may be generally greater than the area of the vibration panel 113. If the area of the bonding medium 1142 is greater than the area of the vibration panel 113, an area of a portion of the bonding medium 1142 that is not in contact with the vibration panel 113 may not be counted as the area of the bonding medium 1142. In some embodiments, a ratio of a thickness of the bonding medium 1142 to a thickness of the face attachment sleeve 1141 may be in a range of 0.4-1.2. If the ratio is too small, it causes the bonding force provided by the bonding medium 1142 to be insufficient; if the ratio is too large, it causes the mechanical vibration generated by the transducer device 112 to be lost too much during a transmission process through the face attachment sleeve 1141 and the bonding medium 1142. In some embodiments, the thickness of the bonding medium 1142 may be less than the thickness of the face attachment sleeve 1141. It should be noted that in the embodiment where a thickness of a portion of the face attachment sleeve 1141 connected with the vibration panel 113 through the bonding medium 1142 is not equal to a thickness of another portion of the face attachment sleeve 1141 not connected with the vibration panel 113, when the ratio or a magnitude relationship between the thickness of the bonding medium 1142 and the thickness of the face attachment sleeve 1141 is calculated, the thickness of the face attachment sleeve 1141 may be specifically expressed as the thickness of the portion (e.g., a body portion 11411 described below) of the face attachment sleeve 1141 connected with the vibration panel 113 through the bonding medium 1142.

It should be noted that the electronic device 10 may include a plurality of face attachment components 114 such that the user can replace the face attachment component 114 with a new one when needed. The bonding medium 1142 may be fixed on the face attachment sleeve 1141 in advance, i.e., the bonding medium 1142 and the face attachment sleeve 1141 may be integrated as a whole. A piece of release paper may be provided on a side of the bonding medium 1142 bonded to the vibration panel 113 to maintain the viscosity of the bonding medium 1142. When replacing a new face attachment component 114, the user can tear off the release paper thereon. In some embodiments, the bonding medium 1142 may also be independent of the face attachment sleeve 1141.

Figure 4:
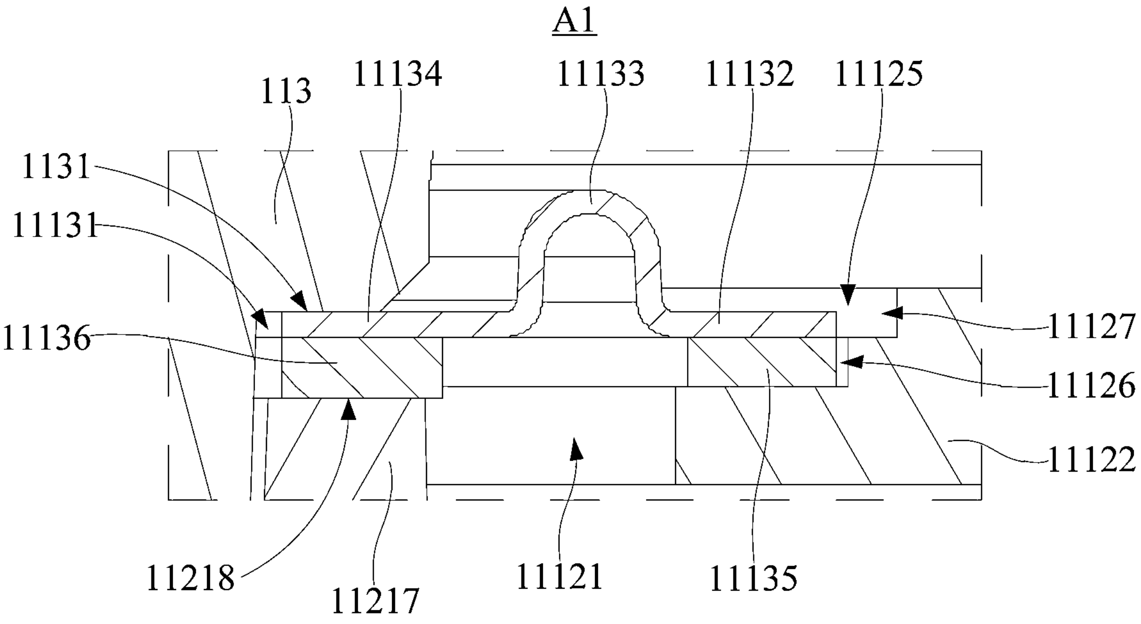
FIG. 4 is a schematic structural diagram illustrating an enlargement of the exemplary core module in FIG. 3 in a region A1.

In some embodiments, referring to FIGS. 2-4, the face attachment component 114 may include a reinforcement member 1143 connected with the face attachment sleeve 1141. A hardness of the reinforcement member 1143 may be greater than a hardness of the face attachment sleeve 1141, so as to increase the local structural strength of the face attachment component 114. For example, the material of the face attachment sleeve 1141 may be silicone, rubber, etc., a material of the reinforcement member 1143 may be polycarbonate or at least one of glass fibers and carbon fibers mixed therein, and the face attachment sleeve 1141 and the reinforcement member 1143 may form an integrally molded structural part through an injection molding process. The face attachment component 114 may be detachably connected with the housing component 111 through the reinforcement member 1143 to prevent an edge region of the face attachment component 114 from colliding with the housing component 111 during a process of the face attachment component 114 vibrating along with the vibration panel 113. In other words, a middle region and the edge region of the face attachment component 114 may be detachably connected with the vibration panel 113 and the housing component 111, respectively. Accordingly, the face attachment component 114 and the housing component 111 may be enclosed to form a cavity that at least accommodates the transducer device 112 and the vibration panel 113. In some embodiments, when the edge region of the face attachment sleeve 1141 and the housing component 111 have a sufficiently large safety clearance, the face attachment component 114 may not include the reinforcement member 1143, and the edge region of the face attachment sleeve 1141 may not be connected with the housing component 111. In some embodiments, when the face attachment component 114 does not need to be replaced, the face attachment component 114 may also be non-detachable.

In some embodiments, the housing component 111 may include a core housing 1111. One end of the core housing 1111 may be open, the transducer device 112 may be at least partially located in the core housing 1111, and the vibration panel 113 may be at least partially located outside the core housing 1111. The reinforcement member 1143 may be at least partially located in the open end of the core housing 1111, and may be detachably connected with the core housing 1111, such that the face attachment component 114 and the housing component 111 have a certain bonding force.

In some embodiments, the housing component 111 may include the core housing 1111 and a core cover plate 1112 covering the open end of the core housing 1111. The transducer device 112 may be at least partially located in the core housing 1111. The vibration panel 113 may be at least partially located outside the core housing 1111. That is, the face attachment component 114 and the transducer device 112 may be located on two opposite sides of the core cover plate 1112. Accordingly, the core cover plate 1112 may be provided with a first avoidance hole 11121 that allows the vibration panel 113 to be connected with the transducer device 112. The reinforcement member 1143 may be at least partially located outside the core housing 1111, and may be detachably connected with the core cover plate 1112, such that the face attachment component 114 and the housing component 111 have a certain bonding force.

In some embodiments, the transducer device 112 and a bottom of the core housing 1111 may be arranged at intervals in a vibration direction (e.g., a direction indicated by an arrow D1 in FIG. 3) of the transducer device 112 to reduce the risk of collision between the transducer device 112 and the bottom of the core housing 1111 when the transducer device 112 vibrates. In some embodiments, a spacing distance between the transducer device 112 and the bottom of the core housing 1111 in the vibration direction of the transducer device 112 may be in a certain threshold range, so as to ensure that the thickness of the core housing 1111 meets the requirements while protecting the core module 11 in an extreme operation condition such as falling and collision.

Figure 5:
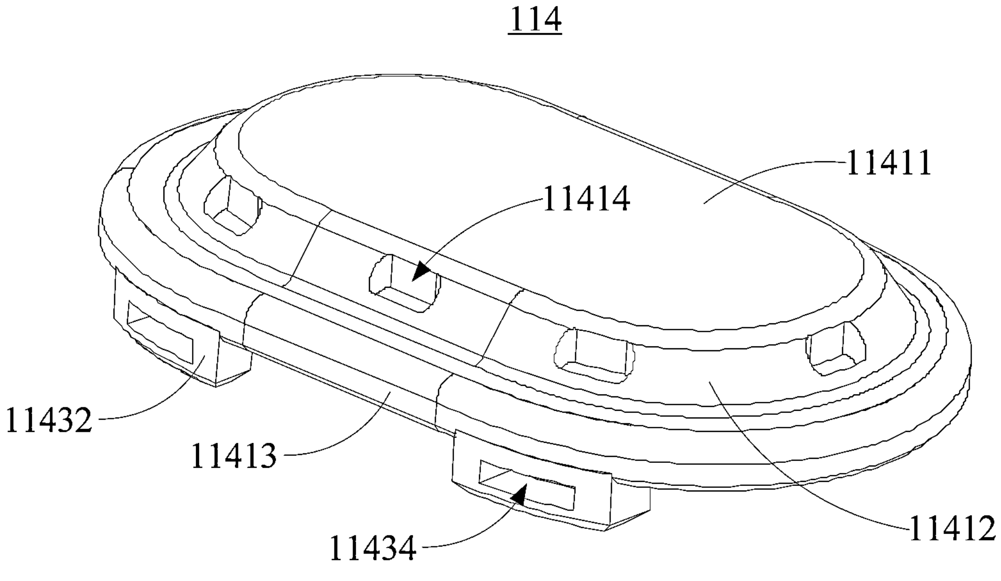
FIG. 5 is a schematic structural diagram illustrating an exemplary face attachment component according to some embodiments of the present disclosure.
Figure 6:
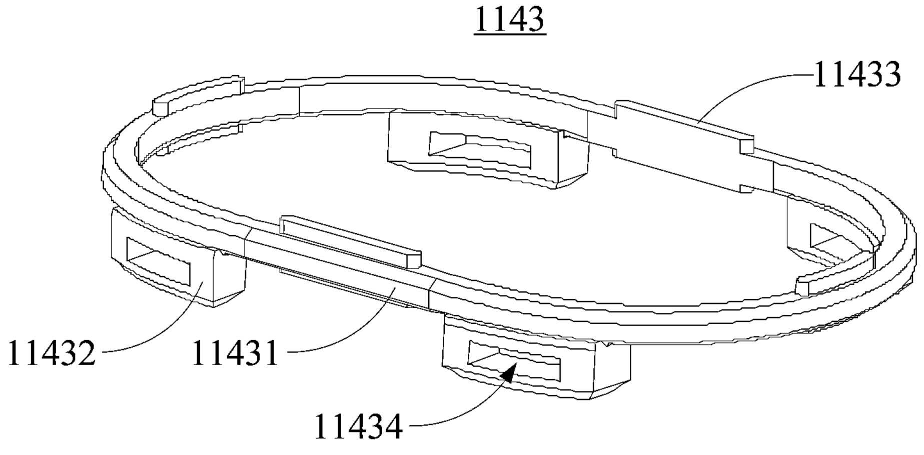
FIG. 6 is a schematic structural diagram illustrating an exemplary reinforcement member in FIG. 5.
Figure 7:
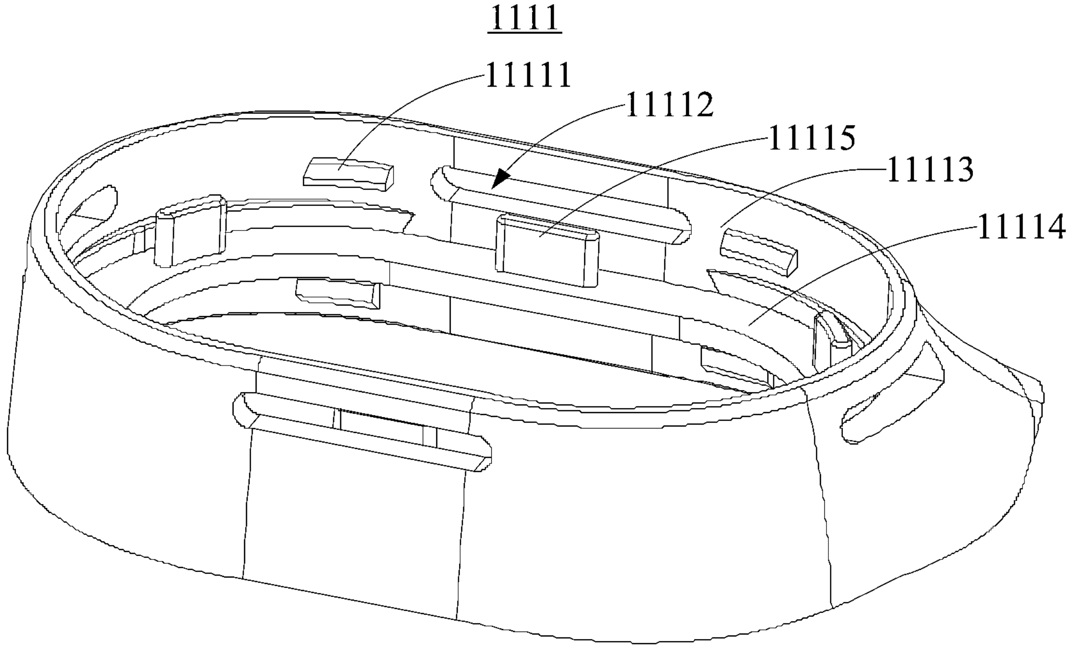
FIG. 7 is a schematic structural diagram illustrating an exemplary core housing according to some embodiments of the present disclosure.
Figure 8:
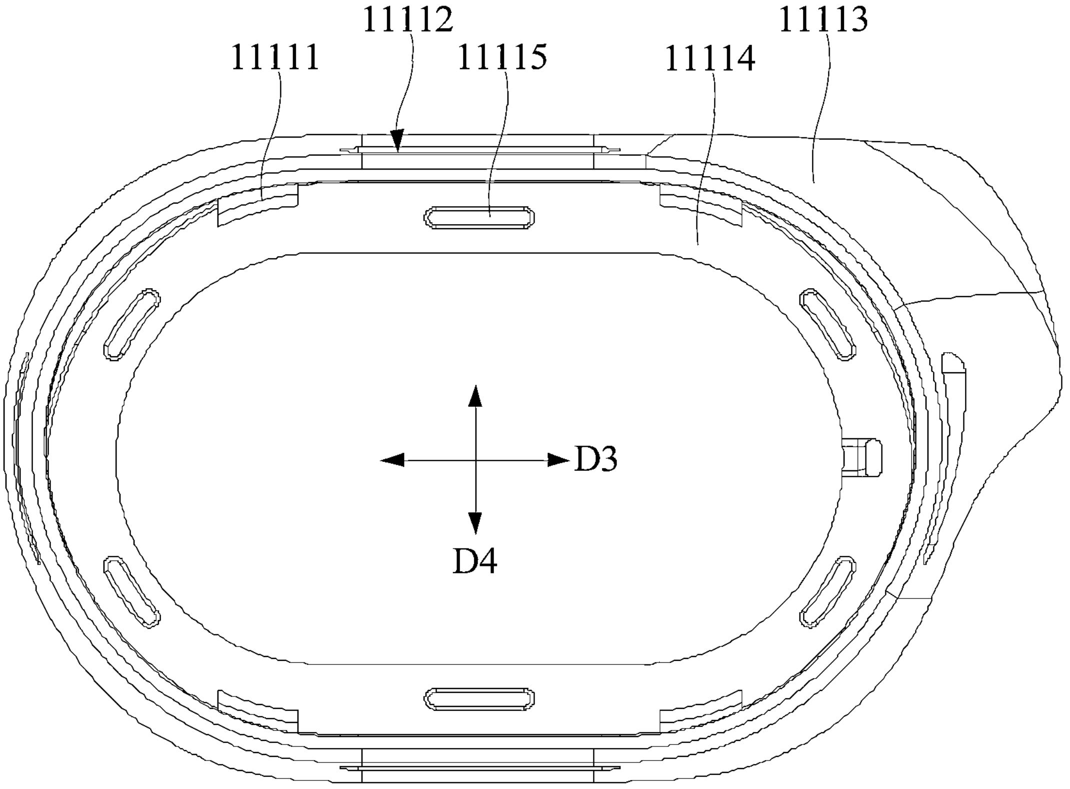
FIG. 8 is a schematic structural diagram illustrating a front view of the exemplary core housing in FIG. 7 in a vibration direction of a transducer device.

In some embodiments, referring to FIGS. 5-8, one of the open end of the core housing 1111 and a flange portion 11432 may be provided with a buckle protrusion 11111, and the other of the open end of the core housing 1111 and the flange portion 11432 may be provided with a buckle groove 11434 for accommodating the buckle protrusion 11111. The buckle protrusion 11111 may be embedded in the buckle groove 11434, i.e., the buckle protrusion 11111 and the buckle groove 11434 may be cooperated to make the reinforcement member 1143 and the core housing 1111 detachably connected, so as to achieve the simple and reliable design. A plurality of buckle protrusions 11111 may be provided. For example, four buckle protrusions 11111 may be provided, as shown in FIG. 8. A count of the buckle grooves 11434 may be equal to a count of the buckle protrusions 11111. For example, four buckle grooves 11434 and four buckle protrusions 11111 may be provided, as shown in FIG. 6, and each of the four buckle grooves 11434 may correspond to each of the four buckle protrusions 11111.

In some embodiments, referring to FIG. 5 and FIG. 6, the reinforcement member 1143 may include an annular body portion 11431 and the flange portion 11432 connected with the annular body portion 11431. The face attachment sleeve 1141 may be connected with at least the annular body portion 11431, for example, by injection molding. A plurality of flange portions 11432 may be provided. For example, four flange portions 11432 may be provided, as shown in FIG. 6, and the plurality of flange portions 11432 may be arranged at intervals in a circumferential direction of the annular body portion 11431. Accordingly, the flange portion 11432 may be detachably connected to the core housing 1111 to achieve detachable connection between the reinforcement member 1143 and the core housing 1111. In some embodiments, the reinforcement member 1143 may include a protrusion portion 11433 connected with the annular body portion 11431. The face attachment sleeve 1141 may be further connected with the protrusion portion 11433, which increases a connection area between the face attachment sleeve 1141 and the reinforcement member 1143, thereby increasing the bonding strength between the face attachment sleeve 1141 and the reinforcement member 1143. A plurality of protrusion portions 11433 may be provided. For example, eight protrusion portions 11433 may be provided, as shown in FIG. 6. The plurality of protrusion portions 11433 may be arranged at intervals in the circumferential direction of the annular body portion 11431. For example, the plurality of flange portions 11432 and the plurality of protrusion portions 11433 may be staggered at intervals in the circumferential direction of the annular body portion 11431.

In some embodiments, a ratio of a cover area of the reinforcement member 1143 covered by the face attachment sleeve 1141 to a surface area of the reinforcement member 1143 may be greater than or equal to 0.8. For example, the annular body portion 11431 and the protrusion portion 11433 may all be covered by the face attachment sleeve 1141 to increase the connection area between the face attachment sleeve 1141 and the reinforcement member 1143 as much as possible.

In some embodiments, referring to FIG. 2, FIG. 3, FIG. 5, and FIG. 6, the face attachment sleeve 1141 may include the body portion 11411, a transition portion 11412, and a wrap portion 11413 which are integrally connected. The body portion 11411 and the wrap portion 11413 may be staggered from each other in a vibration direction D1. An orthographic projection of the wrap portion 11413 on a reference plane perpendicular to the vibration direction D1 may surround an orthographic projection of the body portion 11411 on the reference plane. That is, the wrap portion 11413 may be located at a periphery of the body portion 11411, and the transition portion 11412 may connect the body portion 11411 and the wrap portion 11413. The body portion 11411 may be connected with the vibration panel 113 through the bonding medium 1142. The wrap portion 11413 may wrap the reinforcement member 1143. For example, the wrap portion 11413 may at least wrap the annular body portion 11431. In some embodiments, the wrap portion 11413 may be closer to the transducer device 112 than the body portion 11411 in the vibration direction D1, such that the vibration panel 113 can contact the skin of the user through the body portion 11411. In addition, in the embodiment where the face attachment sleeve 1141 is provided with a plurality of communication holes 11414, the plurality of communication holes 11414 may be disposed on the transition portion 11412, which also prevents the plurality of communication holes 11414 from being covered by the skin of the user.

In some embodiments, on a reference cross section (e.g., a paper surface) parallel to the vibration direction D1, the transition portion 11412 may be arranged in a curved shape to increase the deformation capacity of the transition portion 11412, which avoids the vibration of the vibration panel 113 being restricted by the housing component 111, especially in the embodiment where the middle region and the edge region of the face attachment component 114 are connected with the vibration panel 113 and the housing component 111, respectively. In an extension direction from the body portion 11411 to the wrap portion 11413, the transition portion 11412 may be gradually close to the transducer device 112 and then gradually away from the transducer device 112, or the transition portion 11412 may be gradually close to the transducer device 112 and then parallel to a plane where the first vibration transmission plate 115 is located.

In some embodiments, a movable margin of the transition portion 11412 in the vibration direction D1 may be greater than or equal to a maximum amplitude of the transducer device 112. The movable margin refers to the displacement of the transition portion 11412 when the transition portion 11412 transforms from the curved shape to a straight shape.

In some embodiments, referring to FIG. 2, FIG. 3, and FIGS. 5-8, the open end of the core housing 1111 may be provided with a communication hole 11112. The communication hole 11112 may be located between two adjacent flange portions 11432 in the circumferential direction of the annular body portion 11431, and the communication hole 11112 enables the inside and outside of the core module 11 to be communicated through a channel between the two flange portions 11432. Since a plurality of flange portions 11432 are provided (e.g., four flange portions 11432 are provided as shown in FIG. 6), a plurality of communication holes 11112 may also be provided (e.g., four communication holes 11112 are provided as shown in FIG. 7 and FIG. 8), i.e., each of the plurality of communication holes 11112 may correspond to each of the channels. In this way, although the core housing 1111 generally forms first sound leakage in a far field under the driving action of the transducer device 112, the air in the cavity formed by the face attachment component 114 and the housing component 111 forms second sound leakage in the far field through the communication hole 11112 and the channel under the action of the transducer device 112, and a phase of the second sound leakage and a phase of the first sound leakage are (close to) opposite to each other. For example, a difference between an absolute value of the phase of the second sound leakage and an absolute value of the phase of the first sound leakage is less than 60°, such that the first sound leakage and the second sound leakage can cancel each other out in phase in the far field, which reduces the sound leakage of the core module 11 in the far field. It should be noted that the communication hole 11112 may be a complete through hole disposed on the open end of the core housing 1111, or may be a notch disposed on the open end of the core housing 1111.

In some embodiments, the face attachment sleeve 1141 may be provided with the plurality of communication holes 11414. For example, the plurality of communication holes may be provided on the transition portion 11412. The functions of the plurality of communication holes 11414 may be the same as or similar to those of the plurality of communication holes 11112, which are not repeated here. It should be noted that in the embodiment in which the sound leakage of the core module 11 in the far field can be reduced by providing only the plurality of communication holes 11112, the face attachment sleeve 1141 may not be provided with the plurality of communication holes 11414, which prevents sweat, or the like, from invading the electronic device 10. Similarly, in the embodiment in which the sound leakage of the core module 11 in the far field can be reduced by providing only the plurality of communication holes 11414, the open end of the core housing 1111 may not be provided with the plurality of communication holes, so as to simplify the structure of the core housing 1111.

The inventor of the present disclosure found in the long-term research and development that although the second sound leakage helps reduce the sound leakage of the core module 11 in the far field, a frequency response curve of the second sound leakage is relatively disordered, which leaves room for optimization. To this end, referring to FIG. 2 and FIG. 3, the housing component 111 may include the core cover plate 1112 covering the open end of the core housing 1111. The face attachment component 114 and the transducer device 112 may be located on two opposite sides of the core cover plate 1112, and the core cover plate 1112 may be provided with the first avoidance hole 11121 that allows the vibration panel 113 to be connected with the transducer device 112. The core cover plate 1112 may divide the cavity formed by the face attachment component 114 and the housing component 111 into two cavities. That is, the core cover plate 1112 and the core housing 1111 may be cooperated to form a first cavity, and the face attachment component 114 and the housing component 111 may be cooperated to form a second cavity. For example, the first cavity and the second cavity may be located on the two opposite sides of the core cover plate 1112, respectively. In some embodiments, the transducer device 112 may be at least partially located in the first cavity, and the vibration panel 113 may be at least partially located in the second cavity. Correspondingly, the core module 11 may be provided with a channel for connecting the second cavity and the outside of the core module 11 to allow the air in the first cavity to form third sound leakage in the far field through the channel under the action of the transducer device 112, and a phase of the third sound leakage and the phase of the first sound leakage may be opposite (close to) in phase. For example, a difference between an absolute value of the phase of the third sound leakage and the absolute value of the phase of the first sound leakage is less than 60°, such that the third sound leakage and the first sound leakage can cancel each other out in the far field, which reduces the sound leakage of the core module 11 in the far field. In this way, under the restriction effect of the core cover plate 1112, the air in the first cavity may be restricted to enter and exit the core module 11 to a certain extent, which helps avoid a frequency response curve of the sound leakage that cancels out the first sound leakage in the far field in phase being too disordered, thereby increasing the sound leakage reduction effect of the core module 11. According to a Helmholtz resonance cavity, an area of the channel can be as large as possible. For example, by increasing the count of the channels, or by increasing the aperture of each of the channels, a resonance frequency of the third sound leakage is shifted to a higher frequency band (e.g., a frequency range greater than 4 kHz) as much as possible, which further avoids the third sound leakage being heard by the user.

In some embodiments, a plurality of channels may be provided to increase the area of the channels. The plurality of channels may all be disposed on any one of the structural components such as the face attachment sleeve 1141, the reinforcement member 1143, the core housing 1111, etc. A portion of the plurality of channels may be disposed on one of the structural components such as the face attachment sleeve 1141, the reinforcement member 1143, the core housing 1111, etc., and another portion of the plurality of channels may be disposed on another structural component such as the face attachment sleeve 1141, the reinforcement member 1143, the core housing 1111, etc.

In some embodiments, for any one of the plurality of channels, the channel may be formed by at least any one of the following embodiments.

In some embodiments, for example, the reinforcement member 1143 may be at least partially located in the open end of the core housing 1111, and the channels may be at least partially disposed on the reinforcement member 1143. For example, the flange portions 11432 and a spacing region between two adjacent flange portions 11432 may be located in the open end of the core housing 1111. The spacing region between the two adjacent flange portions 11432 may form a portion of the channel, and the communication hole 11112 may form another portion of the same channel. As another example, the flange portions 11432 and the spacing region between the two adjacent flange portions 11432 may be located in the open end of the core housing 1111, an assembly clearance may exist between the face attachment component 114 and the core housing 1111, the spacing region between the two adjacent flange portions 11432 may form a portion of the channel, and the assembly clearance between the face attachment component 114 and the core housing 1111 may form another portion of the same channel.

In some embodiments, for example, the reinforcement member 1143 may be at least partially located in the open end of the core housing 1111, and the channel may be at least partially disposed at the open end of the core housing 1111. For example, the open end of the core housing 1111 may be provided with the communication hole 11112, and a side of the face attachment component 114 that contacts the core cover plate 1112 may be configured as an uneven surface (e.g., an undulating wavy surface), such that at least a portion of the reinforcement member 1143 does not contact the core cover plate 1112 to form a reserved clearance. In addition, the assembly clearance may exist between the face attachment component 114 and the core housing 1111, and the reserved clearance between the face attachment component 114 and the core cover plate 1112 and the assembly clearance between the face attachment component 114 and the core housing 1111 may form a portion of the channel, and the communication hole 11112 may form another portion of the same channel. As another example, the open end of the core housing 1111 may be provided with the communication hole 11112, the assembly clearance may exist between the face attachment component 114 and the core housing 1111 and between the face attachment component 114 and the core cover plate 1112, respectively, the communication hole 11112 may form a portion of the channel, and the assembly clearance between the face attachment component 114 and the core housing 1111 and between the face attachment component 114 and the core cover plate 1112 may form another portion of the same channel.

In some embodiments, the channel be disposed on the face attachment sleeve 1141. For example, the communication hole 11414 may serve as the channel.

In some embodiments, for example, the reinforcement member 1143 may be at least partially located outside the open end of the core housing 1111, and the channel may be only disposed on the reinforcement member 1143. For example, the spacing region between the two adjacent flange portions 11432 may be at least partially located outside the open end of the core housing 1111, and the spacing region between the two adjacent flange portions 11432 may serve as the channel.

In some embodiments, for example, the reinforcement member 1143 may be at least partially located in the open end of the core housing 1111, the channel may be at least partially disposed at the open end of the core housing 1111 (e.g., the communication hole 11112 may serve as the channel), and at least a portion of the reinforcement member 1143 is not in contact with the core cover plate 1112, such that the first cavity may be communicated with the communication hole 11112 through the clearance between the reinforcement member 1143 and the core cover plate 1112.

In some embodiments, referring to FIG. 3, the channel may be configured such that a gas flow direction (e.g., a direction indicated by an arrow D2 in FIG. 3) between the second cavity and the outside of the core module 11 may intersect with the vibration direction D1 (e.g., an extension direction of the channel may not face a side of the core module 11 facing the skin of the user in a wearing state). In this way, the channel is prevented from being covered by the skin of the user, such that the third sound leakage and the first sound leakage can better cancel each other out in the far field.

In some embodiments, referring to FIG. 2 and FIG. 3, the core cover plate 1112 may include an inner top portion 11122, a connection portion 11123, and an outer bottom portion 11124 which are integrally connected. The inner top portion 11122 and the outer bottom portion 11124 may be staggered from each other in the vibration direction D1. An orthographic projection of the outer bottom portion 11124 on a reference plane perpendicular to the vibration direction D1 may surround an orthographic projection of the inner top portion 11122 on the reference plane. That is, the outer bottom portion 11124 may be located at a periphery of the inner top portion 11122, and the connection portion 11123 may connect the inner top portion 11122 and the outer bottom portion 11124. The outer bottom portion 11124 may be connected with the housing component 111. The outer bottom portion 11124 may be closer to the transducer device 112 than the inner top portion 11122 in the vibration direction D1, which is conducive to avoiding the plurality of communication holes 11112 on the core housing 1111. Accordingly, referring to FIG. 4, the first avoidance hole 11121 may be disposed on the inner top portion 11122.

For example, referring to FIG. 2 and FIG. 3, the housing component 111 may include a sealing film 1113 connected with the core cover plate 1112. The sealing film 1113 may be provided with a second avoidance hole 11131 that allows the vibration panel 113 to be connected with the transducer device 112. An aperture of the second avoidance hole 11131 may be less than an aperture of the first avoidance hole 11121. The sealing film 1113 may be configured to seal an assembly clearance of the first avoidance hole 11121. The assembly clearance refers to a clearance between a structure formed by the connection of the vibration panel 113 and the transducer device 112 and a hole wall surface of the first avoidance hole 11121. The assembly clearance is capable of preventing the vibration panel 113 and/or the transducer device 112 from colliding with the core cover plate 1112. In this way, under the restriction effect of the core cover plate 1112 and the sealing film 1113, the air in the first cavity may be restricted to enter and exit the core module 11 to the greatest extent, which further avoids a frequency response curve of sound leakage that cancels with the first sound leakage in the far field in phase from being too disordered, thereby increasing the sound leakage reduction effect of the core module 11. In addition, due to the arrangement of the sealing film 1113, the aperture of the first avoidance hole 11121 may be larger, which further avoids the collision. Correspondingly, the vibration panel 113 may be connected with the support 1121 through the second avoidance hole 11131 and the first avoidance hole 11112.

In some embodiments, referring to FIG. 2 to FIG. 4, the sealing film 1113 may include a first connection portion 11132, a folded ring portion 11133, and a second connection portion 11134 which are integrally connected. The folded ring portion 11133 may connect the first connection portion 11132 and the second connection portion 11134. A stiffness of the first connection portion 11132 and a stiffness the second connection portion 11134 may be greater than a stiffness of the folded ring portion 11133, respectively. For example, the first connection portion 11132 and the second connection portion 11134 may be arranged in an annular shape, and a cross-sectional shape of the folded ring portion 11133 on a reference cross section parallel to the vibration direction D1 may be arranged in a U-shaped shape, such that the first connection portion 11132 and the second connection portion 11134 may move relative to each other in the vibration direction D1. Accordingly, the second avoidance hole 11131 may be disposed on the second connection portion 11134, i.e., the first connection portion 11132 may be located at a periphery of the second connection portion 11134. In this case, the first connection portion 11132 may be connected with the core cover plate 1112, and the second connection portion 11134 may be connected with the vibration panel 113 or the transducer device 112 to seal the assembly clearance of the first avoidance hole 11121.

In some embodiments of the present disclosure, the sealing film 1113 may be a complete film structure. It should be noted that in some other embodiments of the present disclosure, the sealing film 1113 may be provided with at least one micropore (e.g., an area of the at least one micropore may be less than or equal to 2 $mm^2$), so as to reduce a pressure difference between the inside and outside the first cavity while further optimizing the leakage sound reduction of the sealing film 1113. That is, the at least one micropore may play a role in pressure relief. The sealing film 1113 may not be provided with the at least one micropore, and the assembly clearances between the various structural components when the structural components such as the core housing 1111, the core cover plate 1112, and the sealing film 1113 are assembled to form the first cavity can play a role in pressure relief.

In some embodiments, the sealing film 1113 may be made of rubber, silicone, etc.

In some embodiments, the folded ring portion 11133 may protrude in a direction away from the transducer device 112 in the vibration direction D1, i.e., the folded ring portion 11133 may extend into the first cavity. In this way, compared with the folded ring portion 11133 extending into the second cavity, droplets, dust, etc. that penetrate into the first cavity through the channel are less likely to be accumulated on the folded ring portion 11133, which is conducive to maintaining the reliability of the sealing film 1113.

Figure 9:
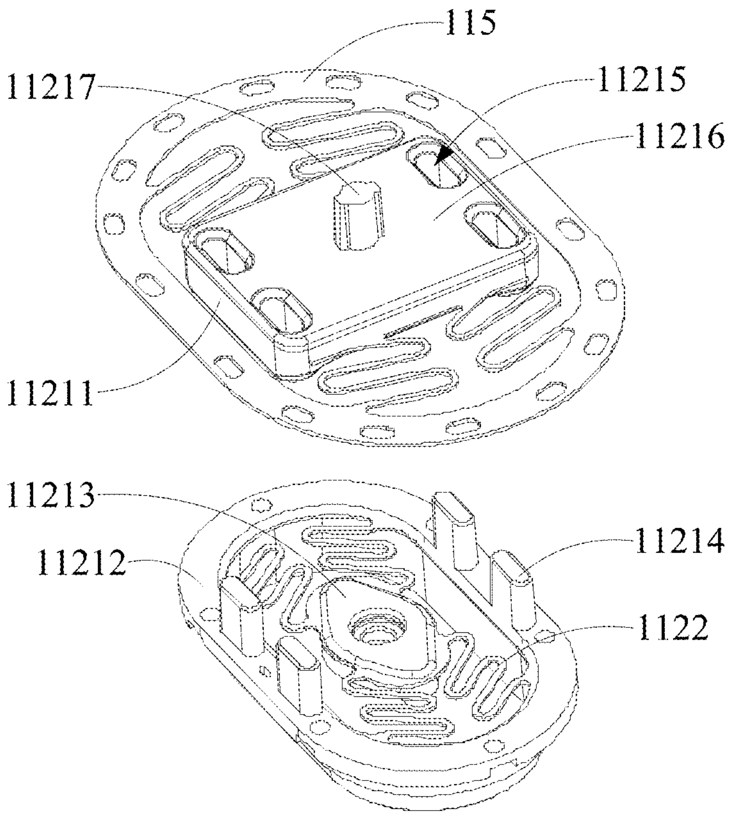
FIG. 9 is a schematic diagram illustrating a partial structure of an exemplary transducer device according to some embodiments of the present disclosure.

In some embodiments, referring to FIG. 2, FIG. 3, FIG. 9, and FIG. 10, the support 1121 may include a first support 11211, a second support 11212, and a suspension 11213. The first support 11211 may be connected with a central region of the first vibration transmission plate 115 (e.g., the first support 11211 and the first vibration transmission plate 115 may form an integral structural component through a process of metal insert injection molding). The second support 11212 may be connected with a peripheral region of the second vibration transmission plate 1122, and the suspension 11213 may be connected with a central region of the second vibration transmission plate 1122 (e.g., the second support 11212, the second vibration transmission plate 1122, and the suspension 11213 may form an integral structural component through the process of metal insert injection molding. In some embodiments, one of the first support 11211 and the second support 11212 may be provided with a plug post 11214, and the other of the first support 11211 and the second support 11212 may be provided with a plug hole 11215 for accommodating the plug post 11214. The plug post 11214 may be embedded in the plug hole 11215, so as to connect the first support 11211 and the second support 11212. A plurality of plug posts 11214 and a plurality of plug holes 11215 may be provided, and each of the plurality of plug posts 11214 may correspond to each of the plurality of plug holes 11215 (e.g., four plug posts 11214 and four plug holes 11215 are provided as shown in FIG. 9). Correspondingly, the magnetic circuit system may be connected with the suspension 11213. For example, the fastening member 1126 may connect the suspension 11213, the one or more magnets 1125, and the bottom of the magnetic shield 1124 together, or the suspension 11213, the one or more magnets 1125, and the magnetic shield 1124 may be bonded together by glue. The coil 1123 may be connected with the second support 11212. The sealing film 1113 may be connected with at least one of the first support 11211 and the vibration panel 113.

In some embodiments, referring to FIG. 9, the first support 11211 may include a body portion 11216 and a plug portion 11217 connected with the body portion 11216. The plug portion 11217 may be arranged in a columnar shape and at least partially embedded in the vibration panel 113, such that the vibration panel 113 may be connected with the support 1121. Accordingly, the plug post 11214 may be disposed on the second support 11212, and the plug hole 11215 may be disposed on the body portion 11216.

Figure 10:
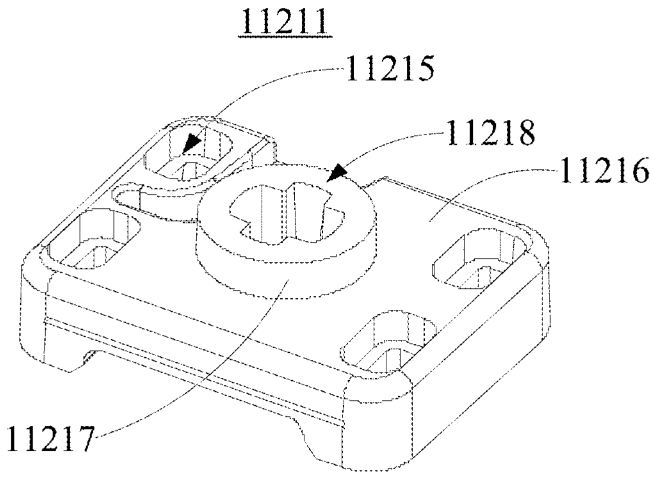
FIG. 10 is a schematic structural diagram illustrating an exemplary first support in FIG. 9.

In some embodiments, referring to FIG. 10, the first support 11211 may include the body portion 11216 and the plug portion 11217 connected with the body portion 11216. The plug portion 11217 may be cylindrical, and the vibration panel 113 may be partially embedded in the plug portion 11217 such that the vibration panel 113 may be connected with the support 1121.

In some embodiments, referring to FIGS. 2-4, at least one of the vibration panel 113 and the support 1121 may be provided with a support end surface corresponding to a surrounding region of the second avoidance hole 11131, and the sealing film 1113 may be fixed on the support end surface, so as to achieve the simple and reliable design. For the embodiment shown in FIG. 9, the support end surface may be at least disposed on the vibration panel 113. For the embodiment shown in FIG. 10, the support end surface may be at least disposed on the support 1121. For example, an end surface of the plug portion 11217 that is not connected with the body portion 11216 may be the support end surface.

In some embodiments, referring to FIGS. 2-4, the support 1121 may be provided with a first support end surface 11218. For example, the first support end surface 11218 may be an end surface of the plug portion 11217 that is not connected with the body portion 11216. The vibration panel 113 may be provided with a second support end surface 1131. The first support end surface 11218 and the second support end surface 1131 may jointly clamp the second connection portion 11134. In other words, the support end surfaces of the vibration panel 113 and the support 1121 facing each other may jointly clamp the second connection portion 11134. In this way, when the vibration panel 113 is connected with the support 1121, the sealing film 1113 may be further pressed on the support 1121, so as to achieve the simple and reliable design.

In some embodiments, referring to FIG. 4, a concave region 11125 may be disposed on a side of the core cover plate 1112 away from the transducer device 112. The first avoidance hole 11121 may be disposed at a bottom of the concave region 11125. The first connection portion 11132 may be connected with the bottom of the concave region 11125 and surround the first avoidance hole 11121. In this way, the concave region 11125 can not only play a positioning role in the process of assembling the sealing film 1113 and the core cover plate 1112, but also increase the flatness of a cavity wall surface of the first cavity. Accordingly, the concave region 11125 may be disposed on the inner top portion 11122.

In some embodiments, the concave region 11125 may include a first concave section 11126 and a second concave section 11127. The first concave section 11126 may be closer to the transducer device 112 than the second concave section 11127 in the vibration direction D1. A size of the second concave section 11127 in a direction perpendicular to the vibration direction D1 may be greater than a size of the first concave section 11126 in the direction perpendicular to the vibration direction D1. In short, the concave region 11125 may be divided into two sections in the vibration direction D1. The first avoidance hole 11121 may be disposed at the bottom of the first concave section 11126. The first connection portion 11132 may be fixed on the bottom of the first concave section 11126.

In some embodiments, the first connection portion 11132 may be connected with the bottom of the first concave section 11126 by a double-sided tape, and the second concave section 11127 may contain glue, which increases the reliability of the connection between the sealing film 1113 and the core cover plate 1112. In other words, a sidewall of the second concave section 11127 may cooperate with the first connection portion 11132 to form an annular glue containing groove for avoiding glue overflow.

In some embodiments, the first connection portion 11132 may be connected with the bottom of the first concave section 11126 by glue. Alternatively, in some embodiments, the first connection portion 11132 may be connected with the second concave section 11127 by glue.

Based on the above description, the first connection portion 11132 may be fixed on the bottom of the first concave section 11126 by a first colloid 11135, such that the sealing film 1113 is connected with the core cover plate 1112. The second connection portion 11134 may be fixed on the end surface (i.e., the first support end surface 11218) of the plug portion 11217 that is not connected with the body portion 11216 by a second colloid 11136, such that the sealing film 1113 is connected with the support 1121. The vibration panel 113 may further press the sealing film 1113 on the support 1121. In some embodiments, the first colloid 11135 and the second colloid 11136 may be the double-sided tape or the glue, respectively. It is should be that when the first colloid 11135 and the second colloid 11136 are the double-sided tape, the first colloid 11135 and the second colloid 11136 may be fixed on the sealing film 1113 in advance; and when the first colloid 11135 and the second colloid 11136 are the glue, the first colloid 11135 and the second colloid 11136 may be fixed on the core cover plate 1112 and the support 1121 in advance, respectively. In some embodiments, the first support end surface 11218 and the bottom of the first concave section 11126 may be flush in the vibration direction D1 without considering factors such as a processing error, an assembly error, etc.

In some embodiments, referring to FIG. 2, FIG. 3, FIG. 7, and FIG. 8, the core housing 1111 may include a first cylindrical sidewall 11113 and a first annular support 11114 connected with an inner wall surface of the first cylindrical sidewall 11113. The outer bottom portion 11124 may be supported on the first annular support 11114. The reinforcement member 1143 may be located between the inner wall surface of the first cylindrical sidewall 11113 and an outer wall surface of the connection portion 11123. Correspondingly, one of the buckle protrusion 11111 and the buckle groove 11434 may be disposed on the first cylindrical sidewall 11113, and the other of the buckle protrusion 11111 and the buckle groove 11434 may be disposed on the reinforcement member 1143. For the convenience of description, the buckle protrusion 11111 or the buckle groove 11434 disposed on the first cylindrical sidewall 11113 may be further defined as a buckle portion. That is, the above buckle portions may be disposed on the inner wall surface of the first cylindrical sidewall 11113, such that the face attachment component 114 may snap-fit the buckle portions through the flange portions 11432. Similarly, the communication hole 11112 may be disposed on the first cylindrical sidewall 11113. In some embodiments, the core cover plate 1112 may press an edge region of the first vibration transmission plate 115 on the first annular support 11114.

In some embodiments, a plurality of columns 11115 may be disposed on the first annular support 11114 (e.g., six columns are provided as shown in FIG. 8). The core cover plate 1112 may be supported on the first annular support 11114, and may be plugged with the plurality of columns 11115. The plurality of columns 11115 may play a positioning role at least in the process of assembling the core cover plate 1112 and the core housing 1111. Correspondingly, the outer bottom portion 11124 may be supported on the first annular support 11114, and may be plugged with the plurality of columns 11115. The plurality of columns 11115, the plurality of buckle portions (e.g., the buckle protrusions 11111, which are not repeated below), and the plurality of communication holes 11112 may be disposed at intervals in a circumferential direction of the first cylindrical sidewall 11113, and the plurality of buckle portions and the plurality of communication holes 11112 may be staggered from each other in the circumferential direction of the first cylindrical sidewall 11113, such that the plurality of columns 11115, the plurality of buckle portions, and the plurality of communication holes 11112 may be reasonably distributed. In some embodiments, at least two of the plurality of columns 11115 and at least two of the plurality of communication holes 11112 may be at least partially overlapped in the circumferential direction of the first cylindrical sidewall 11113 in a one-to-one correspondence manner, such that each of the plurality of columns 11115 may be located between two adjacent buckle portions.

In some embodiments, the plurality of columns 11115 may be hot melt columns to further fix the core cover plate 1112 on the first annular support 11114. The columns 11115 shown in FIG. 2, FIG. 3, FIG. 7, and FIG. 8 are in the form before hot melting, and generally do not exceed the corresponding communication holes 11112 after hot melting to avoid interfering with the air in and out of the first cavity.

In some embodiments, referring to FIG. 7 and FIG. 8, the housing component 111 may have a long axis (e.g., a direction indicated by an arrow D3 in FIG. 8) and a short axis (e.g., a direction indicated by an arrow D4 in FIG. 8) perpendicular to the vibration direction D1 and orthogonal to each other. A size of the first annular support 11114 on the long axis D3 may be greater than a size of the first annular support 11114 on the short axis D4 (e.g., the first annular support 11114 may be arranged in a runway shape). The plurality of columns 11115 may be symmetrically arranged on two sides of the long axis D3 and symmetrically arranged on two sides of the short axis D4 to increase the reliability of the connection between the core cover plate 1112 and the core housing 1111. Similarly, the plurality of buckle portions may be symmetrically arranged on two sides of the long axis D3 and symmetrically arranged on two sides of the short axis D4 to increase the reliability of the face attachment component 114 and the core housing 1111.

In some embodiments, referring to FIG. 7 and FIG. 8, the plurality of columns 11115 and the plurality of buckle portions may be staggered to avoid demolding interference in a molding process such as injection molding. Correspondingly, one communication hole 11112 may be arranged between any two adjacent buckle portions in the circumferential direction of the first cylindrical sidewall 11113, such that the size of the communication hole 11112 in the circumferential direction of the first cylindrical sidewall 11113 is as large as possible.

In some embodiments, referring to FIG. 7 and FIG. 8, when viewed along the vibration direction D1, the communication holes 11112 may be divided into four sets. Two sets of communication holes 11112 may be arranged opposite on the long axis D3, and the remaining two sets of communication holes 11112 may be arranged opposite on the short axis D4. In this way, standing waves in the first cavity are reduced. Although each set of communication holes 11112 in FIG. 7 and FIG. 8 has only one communication hole 11112, those skilled in the art may set a plurality of communication holes 11112 in at least one set of communication holes 11112 according to actual needs, which are not repeated here.

Figure 11:
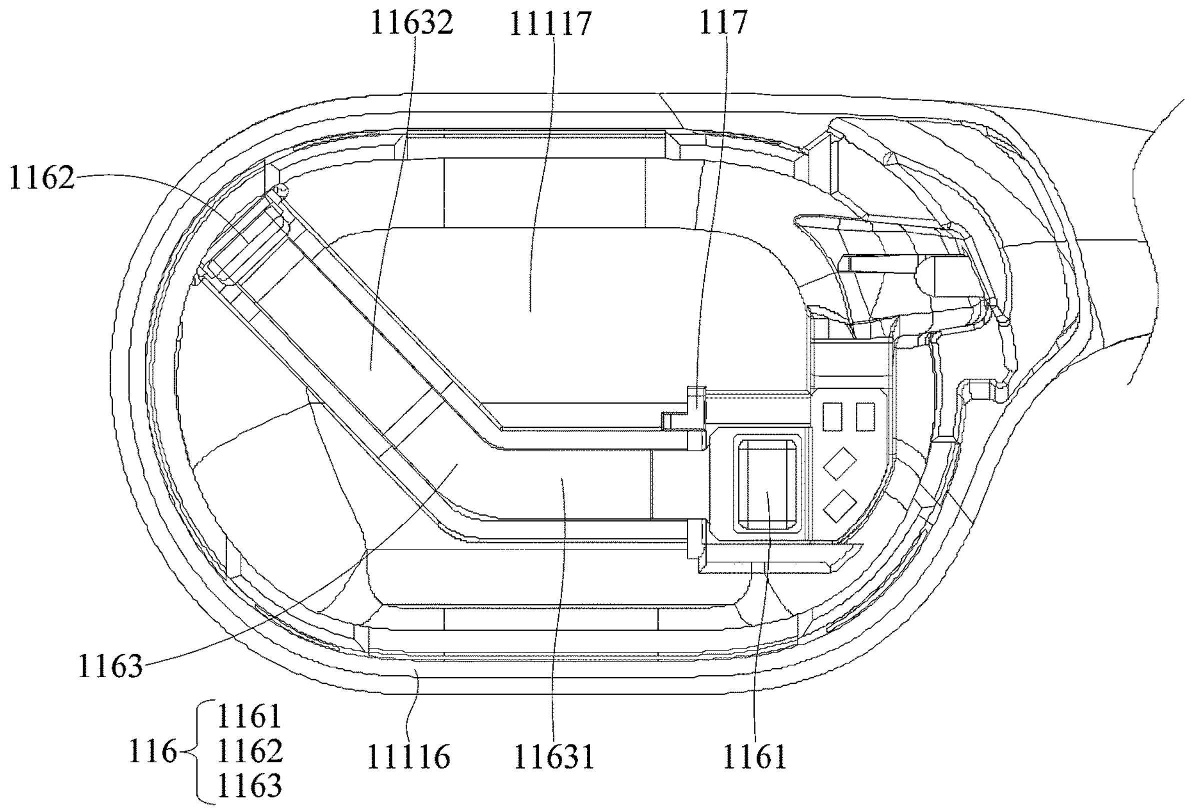
FIG. 11 is a schematic structural diagram illustrating a front view of an exemplary core module in a vibration direction of a transducer device according to some embodiments of the present disclosure.

In some embodiments, referring to FIG. 2, FIG. 3, and FIG. 11, the core module 11 may include a microphone component 116. The microphone component 116 may be disposed in the housing component 111. The microphone component 116 may pick up at least one of an ambient sound, a user voice, and other sounds. In some embodiments, the microphone component 116 may include a first microphone 1161. An orthographic projection of the first microphone 1161 in the vibration direction may be located on the transducer device 112. For example, the first microphone 1161 may be fixed to a bottom of the housing component 111 and may be disposed at intervals from the transducer device 112 in the vibration direction D1. The core module 11 may further include a limiting member 117 disposed in the housing component 111. The limiting member 117 may be configured to stop the transducer device 112 when a motion amplitude of the transducer device 112 in the vibration direction D1 exceeds a preset amplitude threshold, so as to maintain a preset distance between the transducer device 112 and the first microphone 1161, which prevents the first microphone 1161 from being damaged by the transducer device 112, especially under an extreme operation condition such as the core module 11 falling or colliding.

Furthermore, the amplitude threshold may be greater than a maximum amplitude of the transducer device 112 when the core module 11 operates normally. In other words, when the user uses the electronic device 10 daily, even if the volume of the electronic device 10 is adjusted to the maximum, the transducer device 112 does not collide with the limiting member 117 and other structures, so as to avoid noise in the core module 11.

In some embodiments, the limiting member 117 may be provided in a ring shape or a block shape. A center of the limiting member 117 and a center of the transducer device 112 may be aligned in the vibration direction D1, such that a force distribution is more uniform when the limiting member 117 stops the transducer device 112. In some embodiments of the present disclosure, the limiting member 117 may be provided adjacent to the first microphone 1161, so as to better prevent the first microphone 1161 from being damaged by the transducer device 112 through the limiting member 117, especially under an extreme operation condition such as the core module 11 falling or colliding. The limiting member 117 being provided adjacent to the first microphone 1161 means that in a direction of a connection line between the center of the limiting member 117 and the center of the first microphone 1161, a distance between the limiting member 117 and the first microphone 1161 may be at least less than half of a size of the transducer device 112 in the direction of the connection line. For example, the limiting member 117 being provided adjacent to the first microphone 1161 means that in the direction of the connection line between the center of the limiting member 117 and the center of the first microphone 1161, the distance between the limiting member 117 and the first microphone 1161 may be at least less than ½, ⅓, ¼, ⅕, etc., of the size of the transducer device 112 in the direction of the connection line. In some embodiments, a material of the limiting member 117 may be polycarbonate or at least one of glass fibers and carbon fibers mixed therein. Alternatively, the material of the limiting member 117 may also be a structure with a certain elasticity such as silicone, rubber, sponge, etc. When the transducer device 112 collides with the limiting member 117, the limiting member 117 may provide a certain buffer to avoid or reduce the damage that may be caused to the transducer device 112. It is understood that in the present disclosure, the limiting member 117 may also be made of any other material, which is not limited in the present disclosure. The limiting member 117 may be fixed on the bottom of the housing component 111, or fixed on the transducer device 112. In some embodiments, when the limiting member 117 is fixed on the bottom of the housing component 111, the limiting member 117 and the housing component 111 may be an integral structural component.

In some embodiments, referring to FIG. 2, the limiting member 117 and the first microphone 1161 may be configured to remain relatively fixed. For example, the limiting member 117 and the first microphone 1161 may be fixed on the bottom of the core housing 1111. As another example, the limiting member 117 may serve as a portion of the structure of the core housing 1111 and the first microphone 1161 may be found in the bottom of the core housing 1111. An orthographic projection of the transducer device 112 in the vibration direction D1 may cover the first microphone 1161 and the limiting member 117, such that the limiting member 117 may stop the transducer device 112. In some embodiments, in the vibration direction D1, a side of the limiting member 117 facing the transducer device 112 may be higher than a side of the first microphone 1161 facing the transducer device 112, so as to prevent the first microphone 1161 from being damaged by the transducer device 112.

In some embodiments, the limiting member 117 and the first microphone 1161 may both be fixed on the bottom of the housing component 111. The limiting member 117 may be fixed on the transducer device 112. The first microphone 1161 may be fixed on the bottom of the housing component 111. In the vibration direction D1, a distance between a side of the limiting member 117 facing the bottom of the housing component 111 and the bottom of the housing component 111 may be than the distance between the side of the first microphone 1161 facing the transducer device 112 and the transducer device 112, so as to prevent the first microphone 1161 from being damaged by the transducer device 112.

In some embodiments, referring to FIG. 2 and FIG. 3, the microphone component 116 may include a second microphone 1162, and a flexible circuit board 1163 connecting the first microphone 1161 and the second microphone 1162. The second microphone 1162 may be fixed on a sidewall of the core housing 1111. The core housing 1111 may be provided with a wiring groove, and the flexible circuit board 1163 may be fixed in the wiring groove. In this way, the wiring groove can play a positioning role in the process of assembling the flexible circuit board 1163 and the core housing 1111; and when the flexible circuit board 1163 and the core housing 1111 are connected by glue, the wiring groove can also play a role in preventing glue overflow. In this case, since the flexible circuit board 1163 is fixed in the wiring groove, a region where the flexible circuit board 1163 is located may be simply regarded as the wiring groove. In some embodiments, the limiting member 117 and the wiring groove may be staggered from each other to avoid interference between the limiting member 117 and the wiring groove during the processing process. Correspondingly, the core housing 1111 may be provided with sound pickup holes that cooperate with the first microphone 1161 and the second microphone 1162, respectively.

In some embodiments, referring to FIG. 11, the flexible circuit board 1163 may include a first flexible circuit portion 11631 and a second flexible circuit portion 11632 which are integrally connected. The first microphone 1161 may be attached to an end of the first flexible circuit portion 11631 away from the second flexible circuit portion 11632 by means of a surface mounting technology (SMT), and the second microphone 1162 may also be attached to an end of the second flexible circuit portion 11632 away from the first flexible circuit portion 11631 by means of the SMT, thereby forming the microphone component 116 for easy assembly. An angle between an orthographic projection of the first flexible circuit portion 11631 on a reference plane (e.g., a paper surface) perpendicular to the vibration direction D1 and an orthographic projection of the second flexible circuit portion 11632 on the reference plane may be greater than 90° and less than 180°. That is, the flexible circuit board 1163 may be bent into an obtuse angle, such that the first microphone 1161 and the second microphone 1162 may be diagonally arranged in the housing component 111, thereby increasing the distance between the first microphone 1161 and the second microphone 1162, and improving the sound pickup effect of the microphone component 116.

In some embodiments, referring to FIG. 2 and FIG. 3, the core housing 1111 may include a second cylindrical sidewall 11116 and a bottom wall 11117 connected with one end of the second cylindrical sidewall 11116. A second annular support 11118 may be provided at an open end of the second cylindrical sidewall 11116, and the second cylindrical sidewall 11116 may partially extend into the first cylindrical sidewall 11113, such that the first cylindrical sidewall 11113 may be supported on the second annular support 11118. An overlapping portion of the first cylindrical sidewall 11113 and the second cylindrical sidewall 11116 may be provided with a snap-fit structure such that the first cylindrical sidewall 11113 and the second cylindrical sidewall 11116 may be snap-fitted and fixed. The second annular support 11118 may be provided with a glue containing groove such that the first cylindrical sidewall 11113 and the second annular support 11118 are glued to be fixed, which increases the reliability of the connection between the first cylindrical sidewall 11113 and the second cylindrical sidewall 11116. Correspondingly, the first microphone 1161 may be fixed on the bottom wall 11117, the second microphone 1162 may be fixed on the second cylindrical sidewall 11116, and a portion of the wiring groove may be disposed on the bottom wall 11117 and another portion of the wiring groove may be disposed on the second cylindrical sidewall 11116. The limiting member 117 may be fixed on the bottom wall 11117 or serve as a portion of the structure of the bottom wall 11117.

Based on the above description, the core housing 1111 may include a first housing and a second housing connected with the first housing. The first housing may include the first cylindrical sidewall 11113 and the first annular support 11114 connected with an inner wall surface of the first cylindrical sidewall 11113. The second housing may include the second cylindrical sidewall 11116 and the bottom wall 11117 connected with one end of the second cylindrical sidewall 11116. The second cylindrical sidewall 11116 may be connected with the first cylindrical sidewall 11113, such that the second housing may seal one end of the first cylindrical sidewall 11113, and the other end of the first cylindrical sidewall 11113 may be open. Accordingly, the microphone component 116 may be fixed in the second housing, and a depth of the second housing may be relatively small, which reduces the difficulty of assembling the microphone component 116. In some embodiments, the housing component 111 may include a flexible coating 1114 coated on an outer side of the second housing. For example, the flexible coating 1114 may be coated on an outer side of the second cylindrical sidewall 11116 and the bottom wall 11117, and an outer surface of the flexible coating 1114 may be flush with an outer surface of the first cylindrical sidewall 11113 to fill a deviation between the first cylindrical sidewall 11113 and the second cylindrical sidewall 11116. A hardness of the flexible coating 1114 may be less than a hardness of the core housing 1111.

Figure 12:
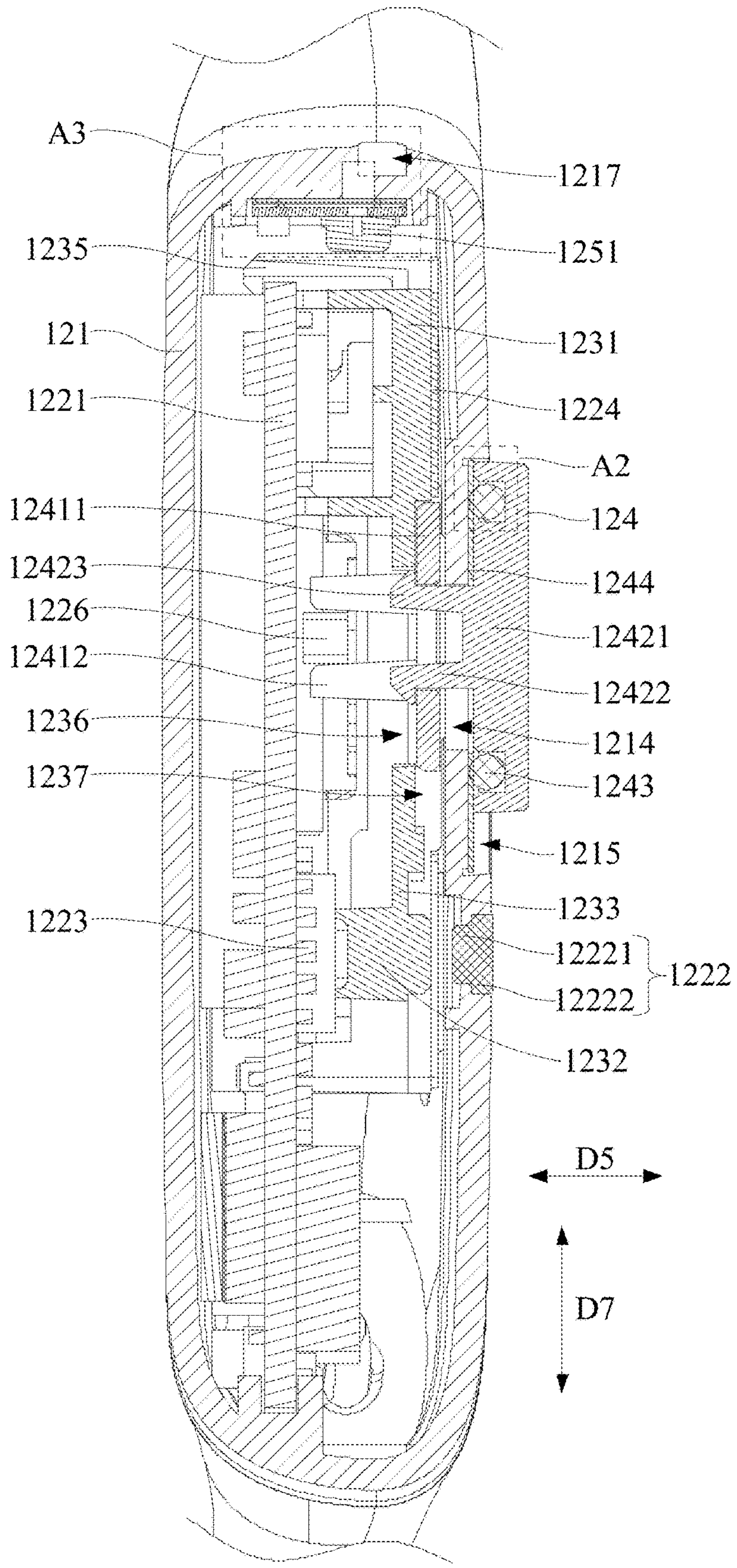
FIG. 12 is a schematic structural diagram illustrating a cross section of an exemplary electronic device according to some embodiments of the present disclosure.
Figure 15:
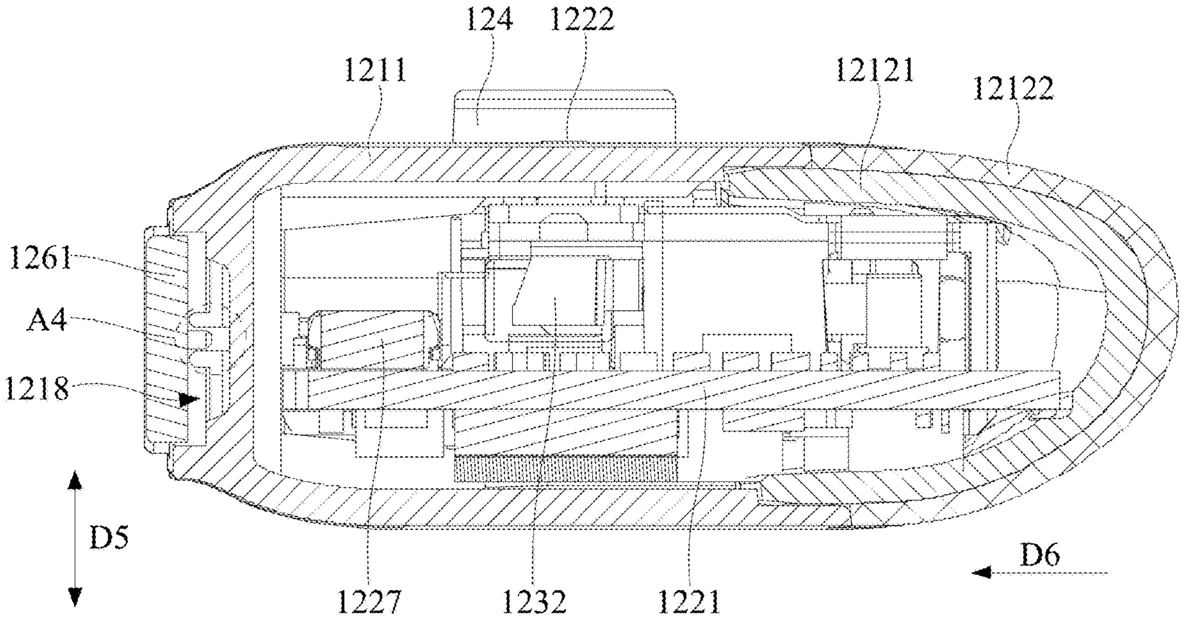
FIG. 15 is a schematic structural diagram illustrating another cross section of the exemplary electronic device in FIG. 12.
Figure 16:
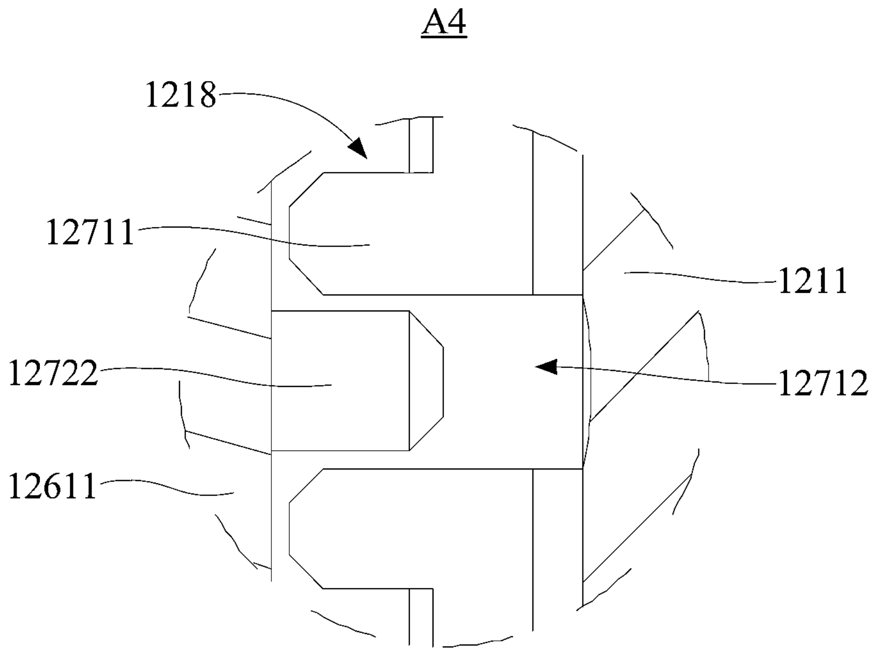
FIG. 16 is a schematic structural diagram illustrating an enlargement of the exemplary electronic device in FIG. 15 in a region A4.
Figure 21:
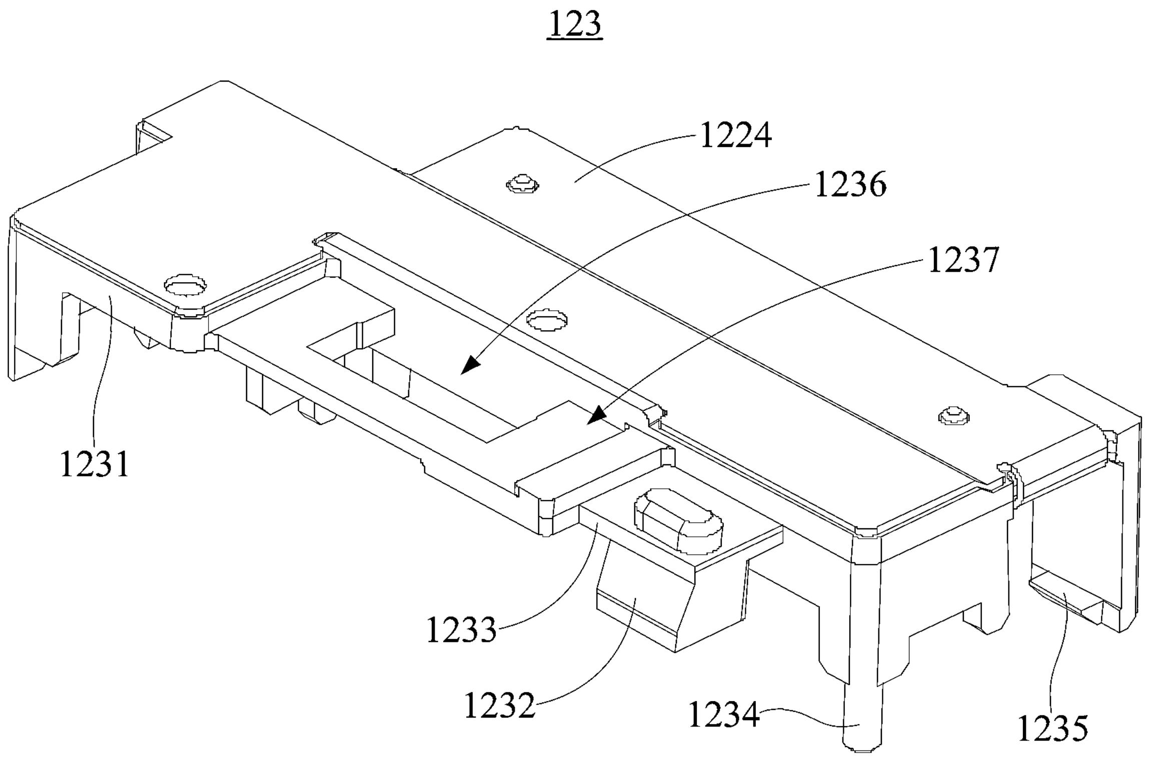
FIG. 21 is a schematic structural diagram illustrating an exemplary antenna bracket according to some embodiments of the present disclosure.

In some embodiments, referring to FIG. 12, FIG. 15, and FIG. 21, the electronic device 10 may include a housing component 121, and a circuit board 1221 and an antenna bracket 123 disposed in the housing component 121. The antenna bracket 123 may be supported on one side of the circuit board 1221. The housing component 121 may include a bin body 1211 and a lampshade 1222 disposed in a sidewall of the bin body 1211. The antenna bracket 123 and the circuit board 1221 may be at least partially accommodated in the bin body 1211. The antenna bracket 123 may be located on a side of the circuit board 1221 facing the lampshade 1222. In some embodiments, an indicator light 1223 may be provided on the side of the circuit board 1221 facing the lampshade 1222. The antenna bracket 123 may include an antenna support portion 1231 and a light guide portion 1232 connected with the antenna support portion 1231. The light guide portion 1232 and the lampshade 1222 may both be a light-transmitting member. The light guide portion 1232 may be configured to guide light emitted by the indicator light 1223 to be emitted to the outside of the electronic device 10. For example, the light emitted by the indicator light 1223 may be transmitted to the lampshade 1222 through the light guide portion 1232 and then emitted to the outside of the electronic device 10. In this way, even if a distance between the indicator light 1223 and the lampshade 1222 is large due to the existence of the antenna bracket 123, the loss of the light emitted by the indicator light 1223 is reduced under the guidance of the light guide portion 1232, such that the indicator light 1223 does not need to increase the light emission power, thereby reducing the power consumption of the indicator light 1223 and extending the service life of the indicator light 1223.

In some embodiments, an outer surface of the light guide portion 1232 may be coated with a reflective coating or provided with a textured surface, and the light is refracted inside the light guide portion 1232, reducing light leakage emitted from a side of the light guide portion 1232, and improving the utilization rate of the light. A light incident surface of the light guide portion 1232 facing the indicator light 1223 and a light emergent surface facing the lampshade 1222 need to be exposed. For example, the light incident surface of the light guide portion 1232 facing the indicator light 1223 and the light emergent surface facing the lampshade 1222 may not be coated with the reflective coating or may not be provided with the textured surface, so as to allow the light to penetrate through the light guide portion 1232.

In some embodiments, referring to FIG. 12, FIG. 15, and FIG. 21, a center of an orthographic projection of the lampshade 1222 on the circuit board 1221 may not coincide with a center of the indicator light 1223. That is, the lampshade 1222 may be offset relative to the indicator light 1223, such that the setting of the lampshade 1222 is more flexible. In a normal direction of the circuit board 1221 (e.g., a direction indicated by the an arrow D5 in FIG. 12 and FIG. 15), an area of a cross section of one end of the light guide portion 1232 close to the circuit board 1221 may be greater than an area of a cross section of the other end of the light guide portion 1232 close to the lampshade 1222, so as to change a light path of the light emitted by the indicator light 1223 and make the light emitted by the indicator light 1223 and reaching the lampshade 1222 more concentrated. The center of the orthographic projection of the lampshade 1222 on the circuit board 1221 may also coincide with the center of the indicator light 1223.

In some embodiments, referring to FIG. 12, an end surface of the light guide portion 1232 facing the indicator light 1223 may be configured as a curved surface that is recessed into the interior of the light guide portion 1232, similar to a concave structure, so as to better collect the light emitted by the indicator light 1223.

In some embodiments, referring to FIG. 12 and FIG. 21, the antenna bracket 123 may include a connection rib 1233 connecting the light guide portion 1232 and the antenna support portion 1231. That is, the light guide portion 1232 may be connected with the antenna support portion 1231 by the connection rib 1233. In some embodiments, a ratio of a thickness of the connection rib 1233 in a normal direction D5 to a height of the light guide portion 1232 in the normal direction D5 may be in a range of 0.3-0.5. If the ratio is too small, it causes insufficient connection strength between the light guide portion 1232 and the antenna support portion 1231. If the ratio is too large, it causes the light emitted by the indicator light 1223 to excessively leak to the antenna support portion 1231 by the connection rib 1233.

In some embodiments, the antenna support portion 1231, the light guide portion 1232, and the connection rib 1233 may be an integral structural component made of the same material (e.g., integrally formed by a process of injection molding).

In some embodiments, the antenna support portion 1231 and the light guide portion 1232 may be an integral structural component made of different materials (e.g., integrally formed by a process of two-color injection molding). The connection rib 1233 may be a portion of the antenna support portion 1231 or the light guide portion 1232.

Figure 17:
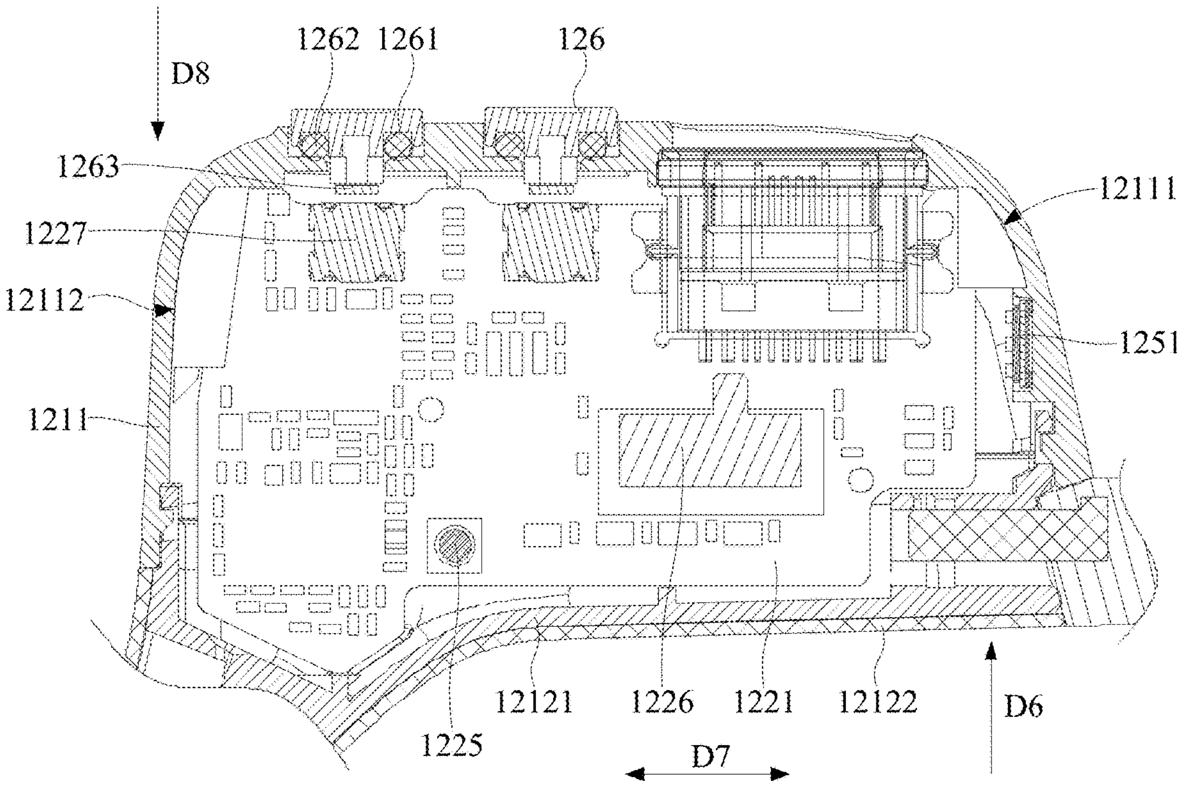
FIG. 17 is a schematic structural diagram illustrating another cross section of the exemplary electronic device in FIG. 12.

In some embodiments, referring to FIG. 12, FIG. 17, and FIG. 21, an antenna pattern 1224 may be disposed on a side of the antenna support portion 1231 away from the circuit board 1221. The antenna pattern 1224 may abut against the circuit board 1221 through a metal elastic member 1225 to achieve electrical contact. The antenna pattern 1224 may be located on a side of the antenna support portion 1231 facing the lampshade 1222 to increase a distance between the antenna pattern 1224 and the circuit board 1221 (i.e., to increase an antenna clearance region), thereby increasing the anti-interference performance of the antenna pattern 1224. In some embodiments, the antenna pattern 1224 may be formed on the antenna support portion 1231 by means of laser direct structuring (LDS), or may be a flexible circuit board attached to the antenna support portion 1231. The metal elastic member 1225 may be a pogo-PIN or a metal spring, etc., which is not limited here. In some embodiments, the metal elastic member 1225 may be fixed on the circuit board 1221.

Figure 1:
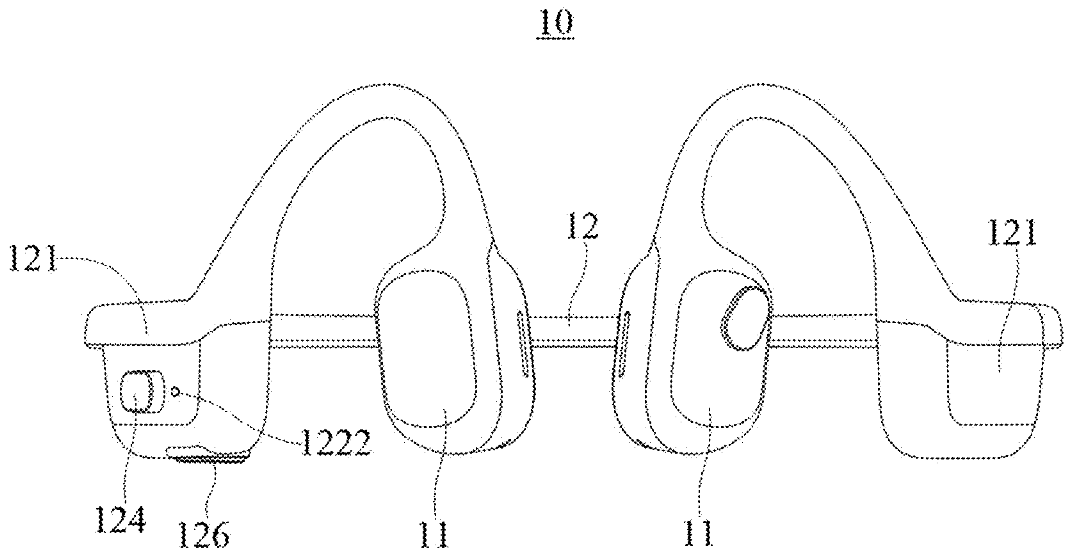
FIG. 1 is a schematic structural diagram illustrating an exemplary electronic device according to some embodiments of the present disclosure.

It should be noted that referring to FIG. 1 and FIG. 12, in the wearing state, the lampshade 1222 may be closer to an outer side than the circuit board 1221, such that the light emitted by the indicator light 1223 and guided by the light guide portion 1232 and the lampshade 1222 may not be blocked. Similarly, in the wearing state, the antenna pattern 1224 may be closer to the outer side than the circuit board 1221. For example, the antenna pattern 1224 may be located between the circuit board 1221 and the lampshade 1222, so as to further increase the anti-interference performance of the antenna pattern 1224. Furthermore, in some embodiments, the electronic device 10 may not include the antenna bracket 123. For example, the antenna pattern 1224 may be disposed on the housing component 121 or on the circuit board 1221. As another example, the lampshade 1222 may further extend into the housing component 121 to reduce the distance between the lampshade 1222 and the indicator light 1223.

In some embodiments, referring to FIG. 21, the antenna bracket 123 may include a positioning column 1234 and a buckle portion 1235 connected with the antenna support portion 1231. The positioning column 1234 plays a positioning role in the process of assembling the antenna bracket 123 and the circuit board 1221, and the buckle portion 1235 enables the antenna bracket 123 and the circuit board 1221 to be snap-fitted and fixed. A plurality of positioning columns 1234 and plurality of buckle portions 1235 may be provided. After the plurality of positioning columns 1234 extend into positioning holes on the circuit board 1221, the plurality of buckle portions 1235 may be buckled with different sides of the circuit board 1221, so as to make the connection between the antenna bracket 123 and the circuit board 1221 more reliable. It should be noted that due to the viewing angle, FIG. 21 only illustrates one positioning column 1234 and one buckle portion 1235. Correspondingly, when the antenna bracket 123 and the circuit board 1221 are snap-fitted and fixed, the metal elastic member 1225 may be in electrical contact with the antenna pattern 1224 at the same time.

In some embodiments, referring to FIG. 12, FIG. 15, and FIG. 17, the housing component 121 may include an end cap 12121 connected with the bin body 1211. The antenna bracket 123 and the circuit board 1221 may be at least partially inserted into the bin body 1211 through an open end of the bin body 1211 along an insertion direction (e.g., a direction indicated by an arrow D6 in FIG. 15 and FIG. 17), and the end cap 12121 may be further connected with the open end of the bin body 1211, such that the circuit board 1221 and the antenna bracket 123 and the structural components thereon may be located in the housing component 121. In this way, since the lampshade 1222 and the antenna bracket 123 are two separate structural components, the lampshade 1222 and the antenna bracket 123 and related structural components thereof may be assembled together in a certain assembly sequence, such that the electronic device 10 does not have a technical problem of being difficult to assemble due to structural interference during the assembly process. Correspondingly, the light guide portion 1232 may be located between the indicator light 1223 and the lampshade 1222 after the antenna bracket 123 and the circuit board 1221 are assembled in place.

Similarly, the end cap 12121 may partially extend into the bin body 1211, and may be supported on a third annular support on an inner side of the open end of the bin body 1211. An overlapping portion of the end cap 12121 and the bin body 1211 may be provided with a buckle structure such that the end cap 12121 and the bin body 1211 may be snap-fitted and fixed. The third annular support may be provided with a glue containing groove for making the end cap 12121 and the third annular support be glued to be fixed, which increases the reliability of the connection between the end cap 12121 and the bin body 1211. In some embodiments, the housing component 121 may include a flexible coating 12122 coated on an outer side of the end cap 12121. An outer surface of the flexible coating 12122 may be flush with an outer surface of the bin body 1211 to fill a deviation between the end cap 12121 and the bin body 1211. A hardness of the flexible coating 12122 may be less than a hardness of the end cap 12121. It should be noted that the flexible coating 12122 and the flexible coating 1114 may be an integral structural component formed by injection molding.

Figure 18:
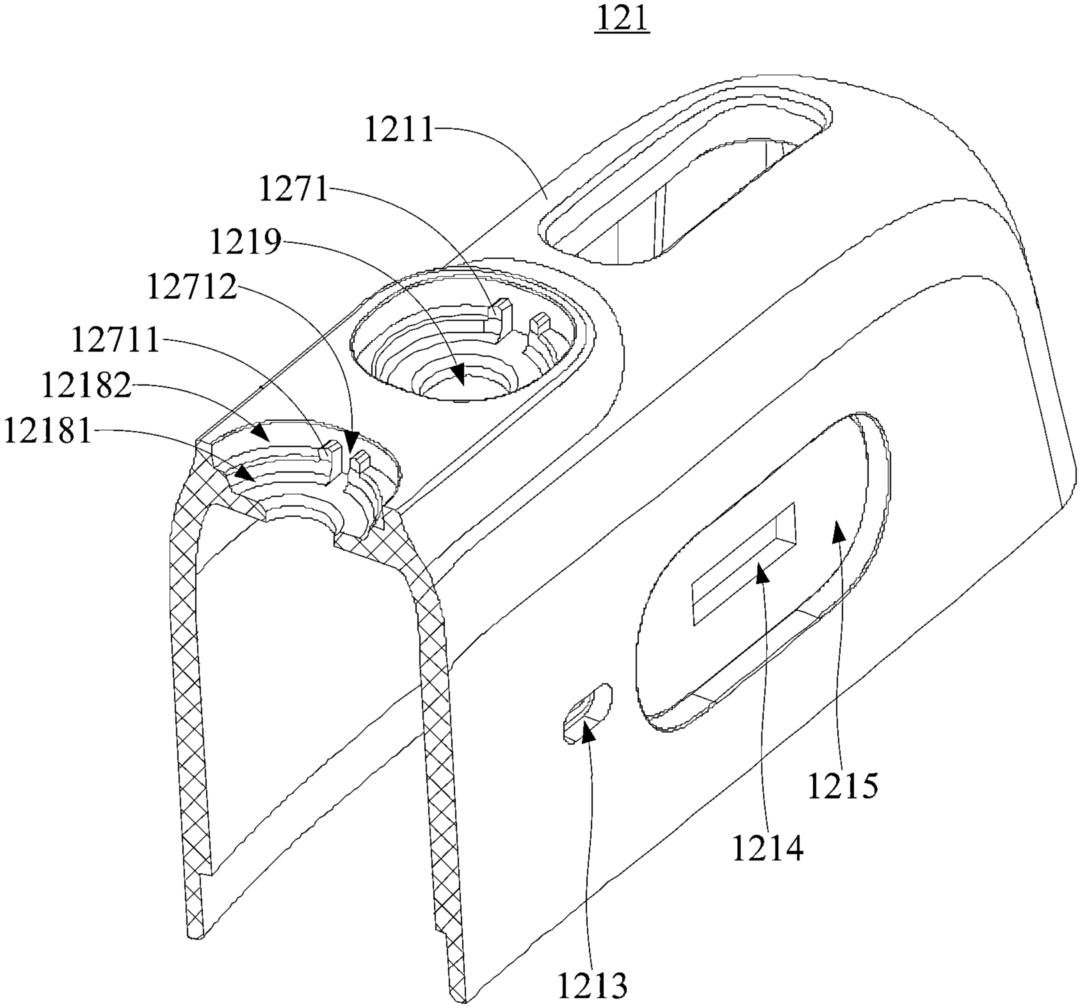
FIG. 18 is a schematic structural diagram illustrating a cross section of an exemplary housing component according to some embodiments of the present disclosure.

In some embodiments, referring to FIG. 12 and FIG. 18, a step hole 1213 may be disposed on a sidewall of the bin body 1211, and the lampshade 1222 may be assembled in the step hole 1213. The lampshade 1222 may include a first light-transmitting portion 12221 and a second light-transmitting portion 12222 which are integrally connected. A radial size of the first light-transmitting portion 12221 may be less than a radial size of the second light-transmitting portion 12222. The step hole 1213 may include a first hole section and a second hole section which are communicated with each other. A radial size of the first hole section may be less than a radial size of the second hole size. The first hole section may be closer to the circuit board than the second hole section in the normal direction D5. The first light-transmitting portion 12221 may be embedded in the first hole section, and the second light-transmitting portion 12222 may be embedded in the second hole section, and supported on a step surface of the step hole 1213. In other words, the lampshade 1222 may be assembled in the step hole 1213 along an assembly direction from outside to inside, which prevents the lampshade 1222 from invading the bin body 1211 under the action of an external force, so as to maintain a relative position relationship between the lampshade 1222 and the bin body 1211.

In some embodiments, referring to FIG. 12, FIG. 18, and FIG. 21, the electronic device 10 may include a sliding key component 124 connected with the housing component 121. The sliding key component 124 may toggle a toggle switch 1226 disposed on the circuit board 1221 along a sliding direction (e.g., a direction indicated by an arrow D7 in FIG. 12) under the action of the external force, so as to expand the control function of the electronic device 10 (e.g., to realize power on/off of the electronic device 10). The sliding key component 124 may extend from an outer side of the housing component 121 into an inner side of the housing component 121 through a sliding groove 1214 disposed on the housing component 121, and may be further connected with the toggle switch 1226 through an avoidance groove 1236 disposed on the antenna bracket 123, such that the user can toggle the toggle switch 1226 by the sliding key component 124. In some embodiments, a portion of the sliding key component 124 may be limited between the antenna bracket 123 and the housing component 121, which can prevent the sliding key component 124 from invading the housing component 121 under the action of the external force, and also prevent the sliding key component 124 from being separated from the housing component 121.

In some embodiments, referring to FIG. 12 and FIGS. 18-21, the sliding key component 124 may include an adapter frame 1241 and a sliding key 1242. The sliding key 1242 may be connected with the toggle switch 1226 through the adapter frame 1241 and configured to receive the external force applied by the user to toggle the toggle switch 1226. The adapter frame 1241 may be disposed in the housing component 121 and may extend from one side of the antenna bracket 123 to the other side of the antenna bracket 123 through the avoidance groove 1236 to be connected with the toggle switch 1226. The sliding key 1242 may extend from the outer side of the housing component 121 into the inner side of the housing component 121 through the sliding groove 1214 to be connected with the adapter frame 1241. In short, the sliding key 1242 and the adapter frame 1241 may be assembly connected. In this way, since the adapter frame 1241 and the sliding key 1242 are two separate structural components, the adapter frame 1241 and the sliding key 1242 and related structural components thereof may be assembled together in a certain assembly order, such that the electronic device 10 does not have the technical problem that is difficult to assemble due to the structural interference during the assembly process. Accordingly, a portion of the adapter frame 1241 may be limited between the antenna bracket 123 and the housing component 121 to prevent the sliding key component 124 from being separated from the housing component 121 after the sliding key component 124 and the housing component 121 and other structural components are assembled. In some embodiments, in order to prevent the sliding key component 124 from being separated from the housing component 121, for example, a portion of the sliding key 1242 may be limited to an inner side of the housing component 121 facing the circuit board 1221, or an additional limiting member such as a retaining ring or a latch independent of the sliding key 1242 may be provided. The limiting member may be assembled with the sliding key 1242 and limited to the inner side of the housing component 121 facing the circuit board 1221. In order for the sliding key component 124 to toggle the toggle switch 1226, the sliding key component 124 may not include the adapter frame 1241. For example, a second plug portion 12422 described below may be connected with the toggle switch 1226.

In some embodiments, referring to FIG. 12 and FIGS. 18-21, the adapter frame 1241 may include an annular body portion 12411 and a first plug-in portion 12412 connected with the annular body portion 12411. The annular body portion 12411 may be located on a side of the antenna bracket 123 away from the circuit board 1221, and the first plug-in portion 12412 may penetrate through the avoidance groove 1236 to be connected with the toggle switch 1226. The sliding key 1242 may include an operation portion 12421, a second plug-in portion 12422 connected with the operation portion 12421, and a snap-fit portion 12423 connected with the second plug-in portion 12422. The operation portion 12421 may be located on an outer side of the housing component 121 to receive the external force applied by the user. The second plug-in portion 12422 may penetrate through the sliding groove 1214 to extend into an insertion groove 12413 of the annular body portion 12411. The snap-fit portion 12423 may snap-fit a side of the annular body portion 12411 facing the circuit board 1221. That is, the snap-fit portion 12423 may be located on the side of the annular body portion 12411 facing the circuit board 1221, such that the sliding key 1242 and the adapter frame 1241 may be snap-fitted and fixed. In some embodiments, in order to achieve snap-fitting and fixation of the sliding key 1242 with the adapter frame 1241, the sliding key 1242 may not include the snap-fit portion 12423. For example, an additional limiting member such as a retaining ring or a latch independent of the sliding key 1242 may be provided. The limiting member may be located on a side of the adapter frame 1241 facing the circuit board 1221 after being assembled with the sliding key 1242.

In some embodiments, a length of the annular body portion 12411 in a sliding direction D7 may be greater than a length of the avoidance groove 1236 in the sliding direction D7, such that the annular body portion 12411 can be limited between the antenna bracket 123 and the housing component 121.

In some embodiments, a width of the annular body portion 12411 in a direction perpendicular to the sliding direction D7 and a plug-in direction may be greater than a width of the avoidance groove 1236 in the direction perpendicular to the sliding direction D7 and the plug-in direction, such that the annular body portion 12411 may be limited between the antenna bracket 123 and the housing component 121. The plug-in direction may be defined as an assembly direction of the plug-in connection between the sliding key 1242 and the adapter frame 1241. For example, the plug-in direction may be parallel to an extension direction of the second plug-in portion 12422.

Since the length of the annular body portion 12411 may be greater than the length of the avoidance groove 1236, and the width of the annular body portion 12411 may be greater than the width of the avoidance groove 1236, the annular body portion 12411 may be supported on the antenna bracket 123, especially in the process of the sliding key 1242 being plugged and connected with the adapter frame 1241 along the assembly direction, so as to simplify the assembly process. Referring to FIG. 12 and FIG. 21, a limiting groove 1237 may be disposed on a side of the antenna bracket 123 away from the circuit board 1221, the avoidance groove 1236 may be disposed at a bottom of the limiting groove 1237, and the annular body portion 12411 may be at least partially located in the limiting groove 1237, which reduces the size of the housing component 121 in the normal direction D5.

Figure 19:
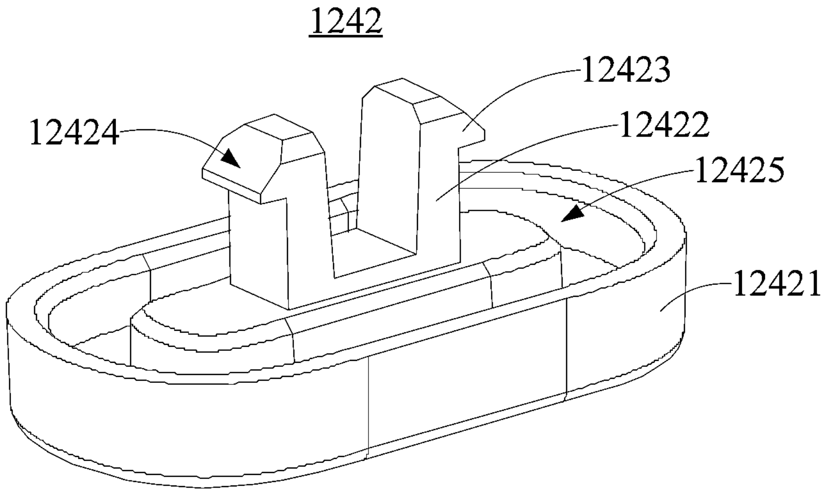
FIG. 19 is a schematic structural diagram illustrating an exemplary sliding key according to some embodiments of the present disclosure.
Figure 20:
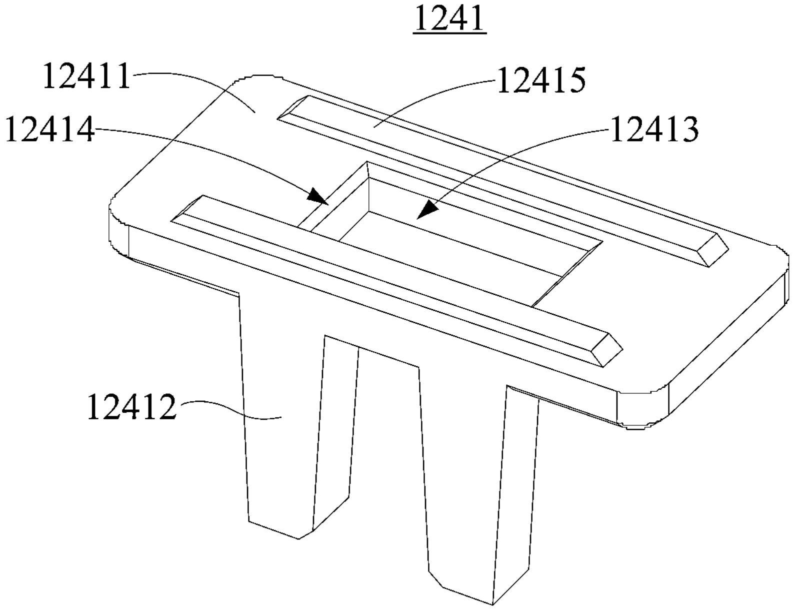
FIG. 20 is a schematic structural diagram illustrating an exemplary adapter frame according to some embodiments of the present disclosure.

In some embodiments, referring to FIG. 12, FIG. 19, and FIG. 20, the second plug-in portion 12422 and the snap-fit portion 12423 may be arranged in two sets at intervals along the sliding direction D7. The two snap-fit portions 12423 may be at least partially located on two opposite sides of the two second plug-in portions 12422, so as to facilitate snap-fitting and fixation of the sliding key 1242 and the adapter frame 1241, and prevent a relative motion between the sliding key 1242 and the adapter frame 1241. Correspondingly, a size of the insertion groove 12413 in the sliding direction D7 may be greater than a size of the insertion groove 12413 in a direction perpendicular to the sliding direction D7 and the plug-in direction. A side of the insertion groove 12413 away from the circuit board 1221 may be provided with a first guide surface 12414. The snap-fit portion 12423 may be provided with a second guide surface 12424. In this way, in the process of the sliding key 1242 extending into the adapter frame 1241, the second guide surface 12424 and the first guide surface 12414 may cooperate with each other to make the two second plug-in portions 12422 and the two snap-fit portions 12423 to approach each other, such that the two snap-fit portions 12423 may penetrate through the insertion groove 12413. Correspondingly, after the two snap-fit portions 12423 penetrate through the insertion groove 12413, relative positions of the two second plug-in portions 12422 and the two snap-fit portions 12423 may be restored to the state before the sliding key 1242 and the adapter frame 1241 are assembled, such that the two snap-fit portions 12423 may be stopped by the annular body portion 12411 in an opposite direction of the sliding key 1242 extending into the adapter frame 1241, thereby realizing snap-fitting and fixation of the sliding key 1242 and the adapter frame 1241. In some embodiments, only one second plug-in portion 12422 and one snap-fit portion 12423 may be provided, and the relative fixation between the sliding key 1242 and the adapter frame 1241 may be maintained using a retaining ring.

In some embodiments, referring to FIG. 12 and FIG. 17, an extension direction of a switch handle of the toggle switch 1226 may be perpendicular to the normal direction D5 to reduce the size of the housing component 121 in the normal direction D5. Correspondingly, referring to FIG. 20, two first plug-in portions 12412 may be provided. The two first plug-in portions 12412 may be arranged at intervals in the sliding direction D7. The switch handle of the toggle switch 1226 may be inserted between the two first plug-in portions 12412, such that the adapter frame 1241 and the switch handle of the toggle switch 1226 may be snap-fitted and fixed, thereby facilitating the sliding key 1242 to toggle the toggle switch 1226 through the adapter frame 1241. In some embodiments, one first plug-in portion 12412 may be provided. A hole may be disposed on the switch handle of the toggle switch 1226 to allow the first plug-in portion 12412 to partially extend into the hole, and make the first plug-in portion 12412 be connected with the switch handle of the toggle switch 1226.

Figure 13:
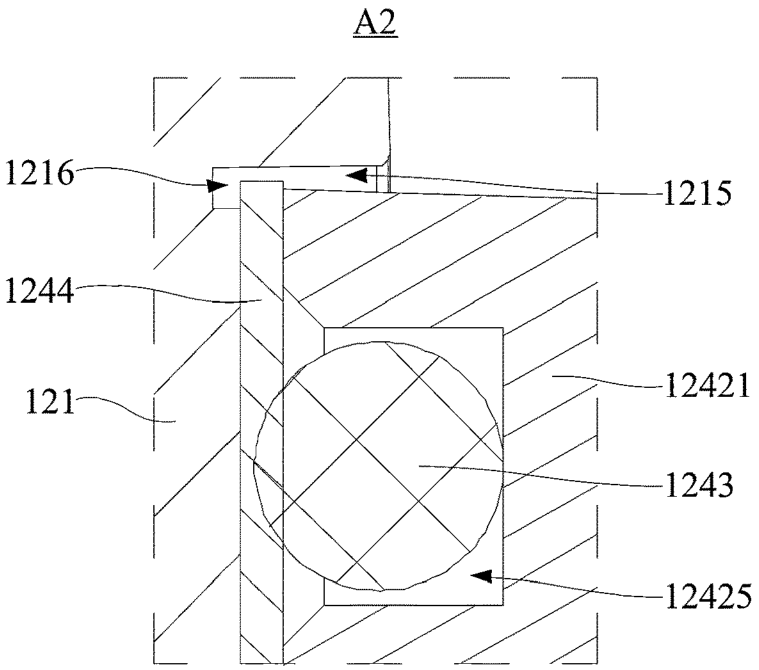
FIG. 13 is a schematic structural diagram illustrating an enlargement of the exemplary electronic device in FIG. 12 in a region A2.

In some embodiments, referring to FIG. 12 and FIG. 13, an inner side the operation portion 12421 facing the circuit board 1221 may be provided with a sealing groove 12425 surrounding the sliding groove 1214. The sliding key component 124 may include a sealing ring 1243 disposed in the sealing groove 12425 to seal the sliding groove 1214. In addition, since the sealing ring 1243 has a certain amount of compression, the sealing ring 1243 may provide a certain amount of damping during the process of operating the sliding key 1242 by the user, so as to realize a better sliding feel. The sealing ring 1243 shown in FIG. 12 and FIG. 13 is in the form before the sealing ring 1243 is compressed, and the sealing ring 1243 has a certain amount of deformation after compression, so as to be elastically supported between the sliding key 1242 and the housing component 121, and achieve a good sealing effect on the sliding groove 1214. In some embodiments, the sealing groove 12425 may be disposed on the housing component 121.

Since the sealing ring 1243 is elastically supported between the operation portion 12421 and the housing component 121, the adapter frame 1241 can be pressed on the housing component 121 to prevent the sliding key component 124 from shaking relative to the housing component 121. Referring to FIG. 20, the adapter frame 1241 may include a sliding rib 12415 disposed on a side of the annular body portion 12411 away from the circuit board 1221. The adapter frame 1241 may be slidably supported on the housing component 121 by the sliding rib 12415 to reduce a contact area between the adapter frame 1241 and the housing component 121, thereby reducing the friction resistance when the sliding key component 124 slides relative to the housing component 121.

In some embodiments, a plurality of sliding ribs 12415 may be provided (e.g., two sliding ribs 12415 may be provided as shown in FIG. 20. The plurality of sliding ribs 12415 may be strip-shaped and located on two sides of the sliding groove 12413 in a direction perpendicular to the sliding direction D7 and the plug-in direction. Each of the plurality of sliding ribs 12415 may extend along the sliding direction D7.

In some embodiments, the sliding rib 12415 may be arranged in a ring shape and surround the insertion groove 12413.

In some embodiments, referring to FIG. 12, FIG. 13, and FIG. 18, a concave region 1215 may be disposed on an outer side of the housing component 121. The sliding groove 1214 may be disposed at a bottom of the concave region 1215. The operation portion 12421 may be at least partially located in the concave region 1215, which reduces the size of the electronic device 10 in the normal direction D5.

In some embodiments, after the sliding key component 124 slides relative to the housing component 121 along the sliding direction D7 until the toggle switch 1226 is in an on state or an off state, the operation portion 12421 may be stopped by a sidewall of the concave region 1215 to prevent the sliding key component 124 from being over-toggled.

In some embodiments, after the sliding key component 124 slides relative to the housing component 121 along the sliding direction D7 until the toggle switch 1226 is in the on state or the off state, the annular body portion 12411 may be stopped by the sidewall of the limiting groove 1237 to prevent the sliding key component 124 from being over-toggled.

In some embodiments, referring to FIG. 12 and FIG. 13, a position of the bottom of the concave region 1215 connected with the sidewall of the concave region 1215 may be provided with an annular groove 1216 to eliminate an R angle at the corner between the bottom of the concave region 1215 and the sidewall, especially when the housing component 121 is manufactured by a process of injection molding. The electronic device 10 may include a gasket 1244 attached to the bottom of the concave region 1215. The gasket 1244 may cover the annular groove 1216, and an edge of the gasket 1244 may be suspended above the annular groove 1216 to allow the gasket 1244 to be attached flatly to avoid the edge of the gasket 1244 from warping. Correspondingly, the sliding key component 124 may be supported on the gasket 1244. In addition, since the edge of the gasket 1244 does not warp, the sliding key component 124 may slide into place along the sliding direction D7. For example, after the sliding key component 124 slides relative to the housing component 121 along the sliding direction D7 until the toggle switch 1226 is in the on state or the off state, the edge of the operation portion 12421 may be located above the annular groove 1216.

In some embodiments, an outer sidewall of the annular groove 1216 away from the sliding groove 1214 may be flush with the sidewall of the concave region 1215.

In some embodiments, the gasket 1244 may be provided with indication information such as a text, a color, and a symbol for indicating the on state or the off state of the toggle switch 1226 (e.g., the text "ON" and "OFF" for indicating the on state and the off state, respectively, and the color green and red for indicating the on state and the off state, respectively). The indication information may be disposed on an inner side of the gasket 1244 facing the bottom of the concave region 1215 to prevent the indication information from being worn away. The indication information may also be disposed on the bottom of the concave region 1215.

In some embodiments, the gasket 1244 may be configured to adjust the damping generated by the sealing ring 1243 during the sliding of the sliding key component 124 relative to the housing component 121 along the sliding direction D7.

In some embodiments, referring to FIG. 12 and FIG. 18, the step hole 1213, the sliding groove 1214, and the concave region 1215 may be located on the same sidewall of the bin body 1211, such that the sliding key component 124 and the lampshade 1222 may be located on the same side of the circuit board 1221, and the user may operate the sliding key component 124 in the wearing state.

Figure 14:
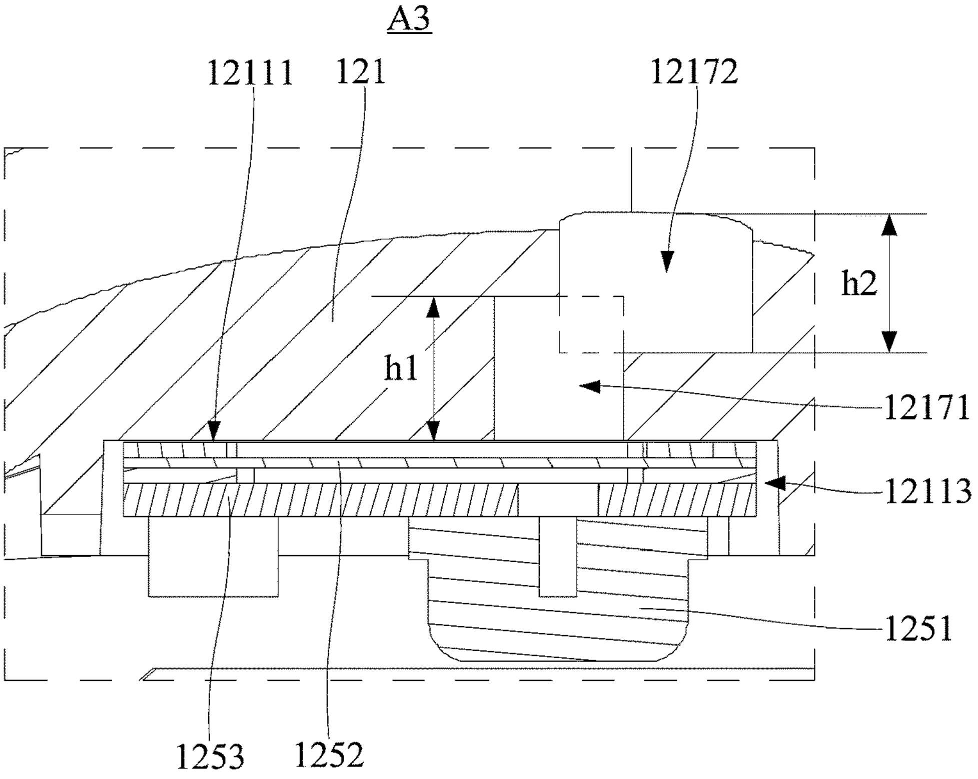
FIG. 14 is a schematic structural diagram illustrating an enlargement of the exemplary electronic device in FIG. 12 in a region A3.

In some embodiments, referring to FIG. 12 and FIG. 14, the electronic device 10 may include a third microphone 1251 disposed in the housing component 121. The third microphone 1251 may be configured to pick up at least one of an ambient sound, a user voice, and other sounds. A sound pickup channel 1217 may be provided on the housing component 121. The third microphone 1251 may be configured to pick up the sound transmitted through the sound pickup channel 1217. In some embodiments, the sound pickup channel 1217 may include a first channel section 12171 and a second channel section 12172 which are communicated with each other. In some embodiments of the present disclosure, the first channel section 12171 and the second channel section 12172 may be communicated with each other, and the inside of the housing component 121 may be communicated with the outside through the first channel section 12171 and the second channel section 12172. The first channel section 12171 may be closer to the third microphone 1251 than the second channel section 12172. A first central axis of the first channel section 12171 and a second central axis of the second channel section 12172 may not coincide. In this way, the first channel section 12171 and the second channel section 12172 may be staggered from each other, which prevents external liquid droplets, or the like, from directly impacting the third microphone 1251, thereby extending the service life of the third microphone 1251.

In some embodiments of the present disclosure, the sound pickup channel 1217 may include three or more channel sections. The three or more channel sections may be communicated with each other and enable the inside of the housing component 121 and the outside to be communicated.

In some embodiments, the electronic device 10 may include a protective net 1252 disposed in the housing component 121. The protective net 1252 may cover the first channel section 12171, which further prevents the external droplets from directly impacting the third microphone 1251, thereby extending the service life of the third microphone 1251. The first central axis and the second central axis may be perpendicular to the protective net 1252, respectively.

In some embodiments, referring to FIG. 12 and FIG. 14, an orthographic projection of the first channel section 12171 on the protective net 1252 and an orthographic projection of the second channel section 12172 on the protective net 1252 may be partially overlapped, such that the first central axis of the first channel section 12171 may not coincide with the second central axis of the second channel section 12172.

In some embodiments, an area of a cross section of the second channel section 12172 on a reference plane perpendicular to the first central axis may be greater than an area of a cross section of the first channel section 12171 on a reference plane perpendicular to the second central axis. For example, the first channel section 12171 and the second channel section 12172 may be a cylindrical hole, respectively and an aperture of the first channel section 12171 may be less than an aperture of the second channel section 12172. In this way, the sound pickup channel 1217 may be roughly horn-shaped, such that more sound enters the sound pickup channel 1217 to be better collected before entering the third microphone 1251.

It should be noted that in the process of manufacturing the housing component 121 by a process such as injection molding, the first channel section 12171 and the second channel section 12172 may be formed on the housing component 121 by two mold cores, respectively, and demolding directions of the two mold cores may be opposite to each other, so as to obtain the first channel section 12171 and the second channel section 12172 with different areas of cross sections.

In some embodiments, an overlapping region between the orthographic projection of the first channel section 12171 on the protective net 1252 and the orthographic projection of the second channel section on the protective net 1252 may have an overlapping area, and the orthographic projection of the first channel section 12171 on the protective net 1252 may have a projection area. A ratio of the overlapping area to the projection area may be in a range of 0.4-0.6. If the ratio is too small, it causes a connection area between the first channel section 12171 and the second channel section 12172 to be too small, which is not conducive to the sound entering the third microphone 1251 through the sound pickup channel 1217. If the ratio is too large, it increases the risk of the third microphone 1251 being directly impacted by the external droplets, etc.

In some embodiments, the first central axis and the second central axis may be arranged in parallel to make a wall thickness of the housing component 121 more uniform and avoid being too thin locally. Referring to FIG. 14, the first channel section 12171 and the second channel section 12172 may be partially overlapped on the first central axis. A ratio of a size (e.g., |h1-h2|) of the overlapping portion between the first channel section 12171 and the second channel section 12172 to the smaller of a depth (e.g., h1 in FIG. 14) of the first channel section 12171 and a depth (e.g., h2 in FIG. 14) of the second channel section 12172 may be in a range of 0.5-0.8. If the ratio is too small, it causes the connection area between the first channel section 12171 and the second channel section 12172 to be too small, which is not conducive to the sound entering the third microphone 1251 through the pickup channel 1217. If the ratio is too large, it causes the housing component 121 to be too thin locally. It is understood that in some embodiments, the first central axis and the second central axis may also be arranged at an angle, such that a length of the sound pickup channel 1217 may be adjusted when the wall thickness of the housing component 121 is constant.

In some embodiments, referring to FIG. 12, FIG. 15, and FIG. 17, the housing component 121 may have a first direction, a second direction, and a third direction which are orthogonal to each other. The housing component 121 may include the bin body 1211 and an end cover 12121 which are buckled with each other in the first direction. A size of the housing component 121 in the second direction may be greater than a size of the housing component 121 in the third direction. Based on the above related description, the first direction, the second direction, and the third direction may be parallel to the insertion direction D6, the sliding direction D7, and the normal direction D5, respectively. In other words, the housing component 121 may be configured as a flat structure, which reduces the size of the housing component 121 in the normal direction D5.

In some embodiments, referring to FIG. 17, the bin body 1211 may be provided with a first inner wall 12111 and a second inner wall 12112 which are arranged at intervals from each other in the second direction. A size of the first inner wall 12111 in the first direction may be less than a size of the second inner wall 12112 in the first direction. That is, a depth of the bin body 1211 in the first direction is not equal everywhere, but has a certain difference. The protective net 1252 may be fixed on the first inner wall 12111, and the third microphone 1251 may be fixed on the protective net 1252. In this way, since the third microphone 1251, the protective net 1252, and other related structures are arranged at a relatively shallow position in the bin body 1211, the assembly difficulty of the electronic device 10 may be lower. Correspondingly, the sound pickup channel 1217 may be disposed on a sidewall of the bin body 1211.

In some embodiments, a concave region 12113 may be formed on the first inner wall 12111, and the sound pickup channel 1217 may be communicated with a bottom of the concave region 12113. The protective net 1252 may be fixed on the bottom of the concave region 12113 by a double-sided tape or a colloid (e.g., glue). The third microphone 1251 may be at least partially located in the concave region 12113, and may be fixed on the protective net 1252 by the double-sided tape or the colloid (e.g., the glue), so as to increase the anti-drop capability of the third microphone 1251. Similarly, the third microphone 1251 may be attached to the flexible circuit board 1253 by the SMT to be connected with the circuit board 1221.

In some embodiments, the first inner wall 12111 may be closer to a middle position of the support component 12 than the second inner wall 12112, i.e., farther away from the core module 11. In the wearing state, the sound pickup channel 1217 may point to the back of the head, which increases the anti-interference performance of the third microphone 1251.

It should be noted that the related improvements to the sound pickup channel 1217 may also be applied to sound pickup holes provided on the housing component 111 that respectively cooperate with the first microphone 1161 and the second microphone 1162, which are not repeated here.

In some embodiments, referring to FIG. 15, FIG. 17, and FIG. 18, the electronic device 10 may include a key component 126 connected with the housing component 121. The key component 126 may press a touch switch 1227 on the circuit board 1221 along a pressing direction (e.g., a direction indicated by an arrow D8 in FIG. 17) under the action of an external force, so as to expand a control function of the electronic device 10 (e.g., to realize power on/off of the electronic device 10, and to realize a volume increase/decrease of the electronic device 10). An outer side of the housing component 121 may be provided with a concave region 1218. A bottom of the concave region 1218 may be provided with a key through hole 1219. The key component 126 may be partially located in the concave region 1218, and extend into the housing component 121 through the key through hole 1219 to approach the touch switch 1227.

In some embodiments, two key components 126 may be provided. One of the two key components 126 may be at least configured to realize the volume increase of the electronic device 10, and the other of the two key components 126 may be at least configured to realize the volume reduction of the electronic device 10. For example, the two key components 126 may be respectively configured to realize the volume increase/decrease of the electronic device 10, and one of the two key components 126 may be further reused to realize the power on/off of the electronic device 10. Referring to FIG. 17 and FIG. 18, the two key components 126 may be respectively arranged in respective concave regions 1218, and the two concave regions 1218 may be arranged at intervals and extend into the housing component 121 through respective key through holes 1219, such that the two key components 126 are independent of each other and do not interfere with each other. Correspondingly, two touch switches 1227 may also be provided, and each of the two touch switches 1227 may correspond to each of the two key components 126.

In some embodiments, one key component 126 may be provided. For example, one key component 126 may be provided to realize the power on/off of the electronic device 10.

In some embodiments, referring to FIG. 15, FIG. 17, and FIG. 18, the key component 126 may include a key 1261 and a sealing ring 1262. The key 1261 may be partially located in the concave region 1218 and extend into the housing component 121 through the key through hole 1219 to allow the key component 126 to press the touch switch 1227 along a pressing direction D8 under the action of the external force. The sealing ring 1262 may be located in the concave region 1218 and surround the key through hole 1219 to seal the key through hole 1219. In addition, since the sealing ring 1262 has a certain amount of compression, the sealing ring 1262 may also provide a certain amount of damping and rebound feel when the user operates the key 1261. The sealing ring 1262 shown in FIG. 17 is in the form before compression, and has a certain amount of deformation after compression to be elastically supported between the key 1261 and the housing component 121. In some embodiments, a sealing groove for accommodating the sealing ring 1262 may be provided on a side of the key 1261 facing the housing component 121.

Figure 22:
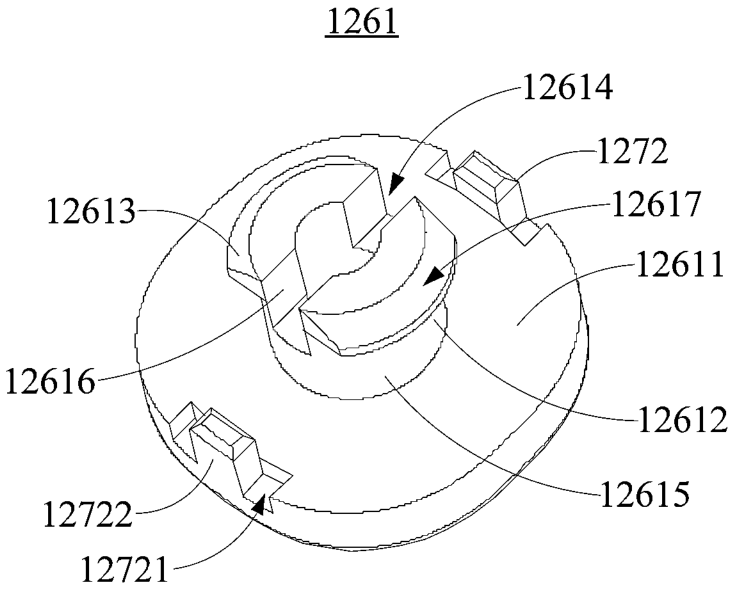
FIG. 22 is a schematic structural diagram illustrating an exemplary key according to some embodiments of the present disclosure.

In some embodiments, referring to FIG. 17, FIG. 18, and FIG. 22, the key 1261 may include an operation portion 12611, a plug-in post 12612 connected with the operation portion 12611, and a buckle portion 12613 connected with the plug-in post 12612. The operation portion 12611 may be at least partially located in the concave region 1218 and supported on the sealing ring 1262. The plug-in post 12612 may penetrate through the sealing ring 1262 and the key through hole 1219 to extend into the housing component 121. The buckle portion 12613 may snap-fit an inner side-wall of the housing component 121. That is, the buckle portion 12613 may be located on an inner side of the housing component 121 facing the circuit board 1221, such that the key 1261 and the housing component 121 may be snap-fitted and fixed. In this case, the sealing ring 1262 may have a certain amount of compression to provide sealing between the key 1261 and the bottom of the concave region 1218. That is, when the key 1261 is connected with the housing component 121, the sealing ring 1262 may be pressed at the same time, thereby increasing the sealing performance of the electronic device 10 at the key through hole 1219, which is simple and reliable. In some embodiments, in order to achieve snap-fitting and fixation between the key 1261 and the housing component 121, the key1261 may not include the buckle portion 12613. For example, an additional limiting member such as a retaining ring or a latch independent of the key 1261 may be provided. The limiting member may be located on the inner side of the housing component 121 facing the circuit board 1221 after being assembled with the key 1261.

In some embodiments, referring to FIG. 17 and FIG. 22, the plug-in post 12612 may be arranged in a cylindrical shape, and an end of the plug-in post 12612 away from the operation portion 12611 may be provided with at least two grooves 12614 extending along an axial direction of the plug-in post 12612 (e.g., two grooves shown in FIG. 22). The at least two grooves 12614 may divide the plug-in post 12612 along the axial direction of the plug-in post 12612 into a first post section 12615 close to the operation portion 12611 and a second post section 12616 away from the operation portion 12611. The first post section 12615 may be continuously arranged along a circumferential direction of the plug-in post 12612. The sealing ring 1262 may sleeve the first post section 12615, such that the sealing ring 1262 can seal the key through hole 1219. The second post section 12616 may be provided with plug-in arms (not marked in FIG. 17 and FIG. 22) arranged at intervals along the circumferential direction of the plug-in post 12612. A count of the buckle portions 12613 may be the same as a count of the plug-in arms, and the buckle portions 12613 and the plug-in arms may be connected in a one-to-one correspondence manner.

In some embodiments, a first guide surface (not marked in FIG. 17 and FIG. 18) may be provided on a side of the key through hole 1219 away from the circuit board 1221, and a second guide surface 12617 may be provided on the buckle portion 12613. In this way, when the key 1261 is inserted into the housing component 121, the second guide surface 12617 and the first guide surface may cooperate with each other to bring the plug-in arms closer to each other, such that the buckle portion 12613 penetrates through the key through hole 1219.

In some embodiments, referring to FIG. 17, the key component 126 may include an elastic adapter 1263 connected with the key 1261. A hardness of the elastic adapter 1263 may be less than a hardness of the key 1261. The key 1261 may press the touch switch 1227 through the elastic adapter 1263 to provide a certain damping and rebound feel in the process of opening the key 1261 by the user. A material of the key 1261 may be polycarbonate or at least one of glass fibers and carbon fibers mixed therein, and a material of the elastic adapter 1263 may be silicone, rubber, etc. In some embodiments, a portion of the elastic adapter 1263 may be inserted into the second post section 12616, and another portion of the elastic adapter 1263 may protrude from one end of the key 1261 facing the touch switch 1227, such that the key 1261 presses the touch switch 1227 through the elastic adapter 1263.

In some embodiments, referring to FIG. 17 and FIG. 18, the concave region 1218 may include a first sub-concave region 12181 and a second sub-concave region 12182. The first sub-concave region 12181 may be closer to the circuit board 1221 than the second sub-concave region 12182 in the pressing direction D8. A size of the second sub-concave region 12182 in a direction perpendicular to the pressing direction D8 may be greater than a size of the first sub-concave region 12181 in the direction perpendicular to the pressing direction D8. In short, the concave region 1218 may be divided into two sub-regions in the pressing direction D8, and the key through hole 1219 may be disposed at a bottom of the first sub-concave region 12181. The sealing ring 1262 may be partially located in the first sub-concave region 12181. The operation portion 12611 may be at least partially located in the second sub-concave region 12182. In this way, when the key 1261 moves relative to the housing component 121 along the pressing direction D8, the operation portion 12611 may be stopped by the bottom of the second sub-concave region 12182 to avoid over-pressing of the key 1261 and excessive deformation of the sealing ring 1262, thereby controlling the stroke of the key 1261 and extending the service life of the sealing ring 1262.

In some embodiments, on a reference cross section parallel to the pressing direction D8, a sidewall of the first sub-concave region 12181 may be at least partially arc-shaped, such that an arc-shaped transition may be formed between the bottom of the first sub-concave region 12181 and the sidewall of the first sub-concave region 12181, thereby reducing (or even eliminating) the clearance between the sealing ring 1262 and the housing component 121, and further increasing the sealing effect of the sealing ring 1262 on the key through hole 1219.

In some embodiments, referring to FIGS. 15-18 and FIG. 22, a first limiting structure 1271 may be disposed in the concave region 1218, the first limiting structure 1271 may be located on an outer side of the sealing ring 1262, and a second limiting structure 1272 may be disposed on the operation portion 12611. In a non-pressed state where the key component 126 is not subjected to an external force, the first limiting structure 1271 and the second limiting structure 1272 may be partially overlapped in the pressing direction D8, and cooperate with each other to limit the key 1261 in a circumferential direction of the key through hole 1219. In this way, the relative position of the key 1261 and the housing component 121 in the circumferential direction of the key through hole 1219 can be maintained, thereby preventing the clearance between the operation portion 12611 and the housing component 121 in a radial direction of the key through hole 1219 from being too small or too large. In addition, when the key 1261 moves relative to the housing component 121 along the pressing direction D8, the operation portion 12611 may be stopped by the first limiting structure 1271, and/or the second limiting structure 1272 may abut against the housing component 121 to avoid over-pressing of the key 1261 and excessive deformation of the sealing ring 1262, thereby controlling the stroke of the key 1261 and extending the service life of the sealing ring 1262.

In some embodiments, referring to FIGS. 5-18 and FIG. 22, the first limiting structure 1271 may include two first limiting blocks 12711 arranged at intervals in the circumferential direction of the key through hole 1219 and a blind hole 12712 disposed at the bottom of the concave region 1218 and located between the two first limiting blocks 12711. The second limiting structure 1272 may include a groove 12721 and a second limiting block 12722 partially located in the groove 12721. The groove 12721 may make the operation portion 12611 be locally thinned. In the non-pressed state, the second limiting block 12722 may be located between the two first limiting blocks 12711. In a pressing state of the key component 126 under the external force, the second limiting block 12722 may extend into the blind hole 12712, and the two first limiting blocks 12711 may extend into the groove 12721, respectively. In this way, the key 1261 can be limited in the circumferential direction of the key through hole 1219, the size of the housing component 121 in the pressing direction D8 can be reduced when the key component 126 has a preset stroke. Correspondingly, the two first limiting blocks 12711 may be located in the second sub-concave region 12182, and the blind hole 12712 may extend to the bottom of the first sub-concave region 12181, such that a depth of the blind hole 12712 is large enough, and the key component 126 has a sufficient stroke.

In some embodiments, a spacing between the two first limiting blocks 12711 in the circumferential direction of the key through hole 1219 may be greater than an aperture of the blind hole 12712 in the circumferential direction of the key through hole 1219. A guide arc surface or a guide slope may be disposed on an edge of the blind hole 12712 close to the first limiting block 12711 to facilitate the second limiting block 12722 to extend into the blind hole 12712.

In some embodiments, the spacing between the two first limiting blocks 12711 in the circumferential direction of the key through hole 1219 may be equal to the aperture of the blind hole 12712 in the circumferential direction of the key through hole 1219, such that the second limiting block 12722 can extend into the blind hole 12712.

In some embodiments, referring to FIGS. 15-18 and FIG. 22, two first limiting structures 1271 and two second limiting structures 1272 may be provided, respectively. The two first limiting structures 1271 may be arranged at intervals in the radial direction of the key through hole 1219, and the second limiting structures 1272 may be arranged at intervals in the radial direction of the key through hole 1219. In this way, the relative position of the key 1261 and the housing component 121 in the circumferential direction of the key through hole 1219 can be further maintained, and the stroke of the key 1261 can be controlled more smoothly.

In some embodiments, referring to FIG. 15, FIG. 17, and FIG. 18, the concave region 1218, the key through hole 1219, or the like, may be located on a bottom of the bin body 1211 opposite to the end cover 12121, such that the key component 126 and other structural components are fixed on the bottom of the bin body 1211, and the user can operate the key component 126 in the wearing state. In some embodiments, the relative position between the bottom of the bin body 1211 and the end cover 12121 may be interchanged, such that the concave region 1218, the key through hole 1219, or the like, may be arranged on the end cover 12121. That is, the key component 126 and other structural components may be fixed on the end cover 12121.

Based on the above description, the housing component 121 may serve as a portion of the support component 12, and may be configured to accommodate the circuit board 1221, a battery, and other related structural components. Referring to FIG. 1, two housing components 121 may be provided. One of the two housing components 121 may be configured to accommodate the circuit board 122, and the other of the two housing components 121 may be configured to accommodate the battery.

Correspondingly, the core module 11, the battery and other structural components may be electrically connected with the circuit board 1221.

The above descriptions are only some embodiments of the present disclosure, and are not intended to limit the protection scope of the present disclosure. Any equivalent device or equivalent process transformation made using the contents of the specification and drawings of the present disclosure, or directly or indirectly used in other related technical fields are also included in the patent protection scope of the present disclosure.

What is claimed is:

1. An electronic device comprising a support component and a core module;

wherein the core module, comprising a housing component, a transducer device, and a vibration panel;

wherein the housing component includes a core housing, a core cover plate covering an open end of the core housing, and a sealing film;

wherein the transducer device includes a support, wherein the core cover plate and the sealing film are respectively provided with a first avoidance hole and a second avoidance hole allowing the vibration panel to be connected with the support, and wherein the sealing film is configured to seal an assembly clearance of the first avoidance hole;

wherein at least one of the vibration panel and the support is provided with a support end surface corresponding to a surrounding region of the second avoidance hole, and the sealing film is fixed on the support end surface; and wherein the support component is connected with the core module to support the core module to be worn to a wearing position.

2. The core module electronic device of claim 1, wherein the support is provided with a first support end surface, the vibration panel is provided with a second support end surface, and the first support end surface and the second support end surface jointly clamp the sealing film.

3. The core module electronic device of claim 2, wherein the sealing film includes a first connection portion, a folded ring portion, and a second connection portion which are integrally connected, the folded ring portion connects the first connection portion and the second connection portion, the first connection portion is connected with the core cover plate, the second avoidance hole is disposed on the second connection portion, and the first support end surface and the second support end surface jointly clamp the second connection portion.

4. The core module electronic device of claim 3, wherein a stiffness of the first connection portion and a stiffness of the second connection portion are greater than a stiffness of the folded ring portion, respectively.

5. The core module electronic device of claim 3, wherein the folded ring portion protrudes in a direction away from the transducer device in a vibration direction of the transducer device.

6. The core module electronic device of claim 3, wherein a concave region is disposed on a side of the core cover plate away from the transducer device, the first avoidance hole is disposed at a bottom of the concave region, and the first connection portion is connected with the bottom of the concave region and surrounds the first avoidance hole.

7. The core module electronic device of claim 6, wherein the concave region includes a first concave section and a second concave section, the first concave section is closer to the transducer device than the second concave section in the vibration direction of the transducer device.

8. The core module electronic device of claim 7, wherein a size of the second concave section in a direction perpendicular to the vibration direction is greater than a size of the first concave section in the direction perpendicular to the vibration direction.

9. The core module electronic device of claim 8, wherein the first connection portion is connected with a bottom of the first concave section by a double-sided tape, and the second concave section contains glue, or the first connection portion is connected with the bottom of the first concave section through the glue.

10. The core module electronic device of claim 6, wherein the core cover plate includes an inner top portion, a connection portion, and an outer bottom portion which are integrally connected, the inner top portion and the outer bottom portion are staggered from each other in the vibration direction of the transducer device, an orthographic projection of the outer bottom portion on a reference plane perpendicular to the vibration direction surrounds an orthographic projection of the inner top portion on the reference plane, the connection portion connects the inner top portion and the outer bottom portion, the outer bottom portion is connected with the housing component.

11. The core module electronic device of claim 10, wherein the core housing includes a first housing and a second housing, the first housing includes a cylindrical sidewall and an annular support connected with an inner wall surface of the cylindrical sidewall, the second housing seals one end of the cylindrical sidewall, the other end of the cylindrical sidewall is open, and the outer bottom portion is supported on the annular support.

12. The core module electronic device of claim 10, wherein the outer bottom portion is closer to the transducer device than the inner top portion in the vibration direction, and the concave region is disposed on the inner top portion.

13. The core module electronic device of claim 1, wherein the core module includes a first vibration transmission plate, the transducer device includes a second vibration transmission plate, a magnetic circuit system, and a coil, the magnetic circuit system is connected with the support by the second vibration transmission plate, and the coil is connected with the support and extends into a magnetic gap of the magnetic circuit system.

14. The core module electronic device of claim 13, wherein the support includes a first support, a second support, and a suspension, the first support is connected with a central region of the first vibration transmission plate and includes a body portion and a plug-in portion connected with the body portion, the plug-in portion is cylindrical, the vibration panel is partially embedded in the plug-in portion, an end face of the plug-in portion not connected with the body portion is the support end surface, the second support is connected with a peripheral region of the second vibration transmission plate, the suspension is connected with a central region of the second vibration transmission plate, the magnetic circuit system is connected with the suspension, and the coil is connected with the second support.

15. The core module electronic device of claim 14, wherein a plug-in portion post is disposed on one of the body portion and the second support, and a plug-in hole for accommodating the plug-in post is disposed on the other of the body portion and the second support, and the plug-in post is embedded in the plug-in hole.

* * * * *